United States Patent
Oh et al.

(10) Patent No.: US 11,151,786 B2
(45) Date of Patent: Oct. 19, 2021

(54) GRADING GARMENT THAT INCLUDES SUPPLEMENTAL MATERIAL

(71) Applicant: CLO Virtual Fashion Inc., Seoul (KR)

(72) Inventors: Seungwoo Oh, Seoul (KR); Jaehwan Ma, Seoul (KR); Bora Kim, Seoul (KR); Yeji Kim, Seoul (KR)

(73) Assignee: CLO VIRTUAL FASHION INC., Seoul (KR)

( * ) Notice: Subject to any disclaimer, the term of this patent is extended or adjusted under 35 U.S.C. 154(b) by 0 days.

(21) Appl. No.: 16/996,465

(22) Filed: Aug. 18, 2020

(65) Prior Publication Data

US 2021/0056755 A1    Feb. 25, 2021

(30) Foreign Application Priority Data

| Aug. 19, 2019 | (KR) | 10-2019-0101261 |
| Aug. 19, 2019 | (KR) | 10-2019-0101262 |
| Aug. 19, 2019 | (KR) | 10-2019-0101367 |
| Apr. 3, 2020 | (KR) | 10-2020-0040798 |

(51) Int. Cl.
     *G06T 17/20*    (2006.01)
(52) U.S. Cl.
     CPC .................. *G06T 17/20* (2013.01)
(58) Field of Classification Search
     None
     See application file for complete search history.

(56) References Cited

U.S. PATENT DOCUMENTS

| 5,615,318 A * | 3/1997 | Matsuura | A41H 3/007 345/420 |
| 2001/0026272 A1* | 10/2001 | Feld | G06T 17/00 345/419 |

(Continued)

FOREIGN PATENT DOCUMENTS

| KR | 10-2014-0108451 A | 9/2014 |
| KR | 10-2016-0117021 A | 10/2016 |

OTHER PUBLICATIONS

Narita, Fumiya, Shunsuke Saito, Takuya Kato, Tsukasa Fukusato, and Shigeo Morishima. "Garment Transfer for Quadruped Characters." In Eurographics (Short Papers), pp. 57-60. 2016.*

(Continued)

*Primary Examiner* — Sultana M Zalalee
(74) *Attorney, Agent, or Firm* — Fenwick & West LLP

(57) ABSTRACT

A grading method and apparatus for garments including supplemental materials is provided. The grading method and apparatus calculates three-dimensional (3D) strain information between a 3D source avatar and a 3D target avatar, calculates two-dimensional (2D) strain information of a 2D pattern corresponding to source garments draped over the 3D source avatar based on the 3D strain information, determines grading information for grading the 2D pattern to correspond to the 3D target avatar based on the 2D strain information, identifies at least one supplemental material included in the source garments, extracts at least one polygon matching the at least one supplemental material among a plurality of polygons modeling the 2D pattern, and performs grading on the at least one supplemental material based on grading information of the at least one polygon.

20 Claims, 16 Drawing Sheets

(56) References Cited

U.S. PATENT DOCUMENTS

| | | | | |
|---|---|---|---|---|
| 2004/0049309 A1* | 3/2004 | Gardner | .................. | G06T 17/00 |
| | | | | 700/132 |
| 2011/0298897 A1* | 12/2011 | Sareen | .................... | G06T 19/00 |
| | | | | 348/47 |
| 2014/0277663 A1* | 9/2014 | Gupta | .................... | G06Q 50/04 |
| | | | | 700/98 |
| 2017/0161948 A1* | 6/2017 | Hua | .......................... | G06T 7/75 |
| 2019/0304182 A1* | 10/2019 | Oh | .......................... | G06T 13/40 |
| 2021/0056755 A1* | 2/2021 | Oh | .......................... | G06T 17/20 |
| 2021/0056767 A1* | 2/2021 | Oh | .......................... | G06T 17/20 |

OTHER PUBLICATIONS

Narita, F. et al., "Pose-Independent Garment Transfer," SIGGRAPH Asia 2014, Dec. 2014, pp. 1.

Brouet, R. et al., "Design Preserving Garment Transfer," ACM Transactions on Graphics, Association for Computing Machinery, Jul. 2012, pp. 1-11.

Sumner, R.W. et al., "Deformation Transfer for Triangle Meshes," ACM Transactions on Graphics, Aug. 2004, pp. 399-405.

* cited by examiner

GRADING GARMENT THAT INCLUDES SUPPLEMENTAL MATERIAL

CROSS-REFERENCE TO RELATED APPLICATIONS

This application claims the benefit of Korean Patent Application No. 10-2019-0101262 filed on Aug. 19, 2019, Korean Patent Application No. 10-2019-0101367 filed on Aug. 19, 2019, Korean Patent Application No. 10-2019-0101261 filed on Aug. 19, 2019, and Korean Patent Application No. 10-2020-0040798 filed on Apr. 3, 2020, in the Korean Intellectual Property Office, the entire disclosures of which are incorporated herein by reference for all purposes.

BACKGROUND

1. Field of the Invention

Embodiments relate to a grading garments that include supplemental materials.

2. Description of the Related Art

A garment appears in three dimensions when worn on a person's body, but the garment is formed of two-dimensional (2D) patterns that are adjoined together. Because flexible fabric is often used as the material for the 2D patterns, the garment may take on a different shape depending on who wears it. Grading refers to the task of scaling up or down a clothing pattern of one size for draping people of different sizes. For example, when a source avatar and a target avatar differ from each other in size or pose, grading garments and supplemental materials of the garments may be performed in accordance with various body sizes and poses of the target avatar based on the source avatar.

SUMMARY

Embodiments relate to automatically deforming a position and size of a supplemental material that is deformed by grading of a two-dimensional (2D) pattern, and embody virtual clothes including the supplemental material designed according to a deformed size of a target avatar without an additional task for the supplemental material.

Embodiments also relate to providing a grading method and apparatus that perform automatic grading on clothes and supplemental materials without newly setting positions of the supplemental materials because a point input by a user when editing moves together as a size of a 2D pattern is automatically deformed by the grading.

Embodiments also relate to providing a grading method and apparatus that perform automatic grading on supplemental materials such as buttons, buttonholes, rubber bands, zippers, a stitches, piping, and the like along an outline of a 2D pattern.

Embodiments also relate to providing a grading method for clothes including a supplemental material, the grading method including calculating three-dimensional (3D) strain information between a 3D source avatar and a 3D target avatar, calculating 2D strain information of a 2D pattern corresponding to source clothes draped over the 3D source avatar based on the 3D strain information, determining grading information for grading the 2D pattern to correspond to the 3D target avatar based on the 2D strain information, identifying at least one supplemental material included in the source clothes, determining at least one polygon matching the at least one supplemental material among a plurality of polygons modeling the 2D pattern, and performing grading on the at least one supplemental material based on grading information of the at least one polygon.

In one or more embodiments, the at least one supplemental material may include at least one of a first-type supplemental material corresponding to a graphic property, a second-type supplemental material corresponding to an editing property, or a third-type supplemental material corresponding to a line property.

In one or more embodiments, the 2D pattern may include a plurality of pattern pieces, and each of the pattern pieces may be modeled with a polygon mesh based on a body type of the 3D source avatar. The polygon mesh may include a plurality of polygons.

In one or more embodiments, the determining of the at least one polygon may include determining the at least one polygon matching the at least one supplemental material among the plurality of polygons modeling the 2D pattern, for each type of the at least one supplemental material.

In one or more embodiments, when the at least one supplemental material is of a first type, the determining of the at least one polygon may include forming at least one graphic layer having a shape of the at least one supplemental material in a polygon mesh of the 2D pattern, and the at least one polygon matching the at least one supplemental material by matching a vertex of the polygon mesh in which the at least one graphic layer is formed to texture coordinates of the at least one supplemental material.

In one or more embodiments, the graphic layer may include at least one of a graphic image, a normal map, or a color layer.

In one or more embodiments, the performing of the grading on the at least one supplemental material may include grading the at least one supplemental material by deforming at least one of a position or a size of the at least one graphic layer based on the grading information of the at least one polygon.

In one or more embodiments, when the at least one supplemental material is of a second type, the determining the at least one polygon may include setting at least one first point for fixing the 2D pattern, indicating a pin image at the at least one first point, inputting a barycentric coordinate corresponding to the pin image to a polygon mesh of the 2D pattern, and determining the at least one polygon matching the at least one supplemental material among the plurality of polygons based on the barycentric coordinate.

In one or more embodiments, the performing of the grading on the at least one supplemental material may include deforming a polygon mesh of the at least one supplemental material based on the grading information of the at least one polygon, calculating a deformed coordinate corresponding to the pin image in the deformed polygon mesh, indicating the pin image on the deformed coordinate and setting a second point for the fixing to the deformed coordinate, and grading the at least one supplemental material in the deformed polygon mesh based on the second point.

In one or more embodiments, then the at least one supplemental material is of a third type, the determining the at least one polygon may include determining the at least one polygon by parameterizing the at least one supplemental material in a polygon mesh of a pattern piece of the 2D pattern to which the at least one supplemental material is applied, based on the grading information of the at least one polygon.

In one or more embodiments, the performing of the grading on the at least one supplemental material may include grading the at least one supplemental material for each type of the at least one supplemental material based on the grading information of the at least one polygon.

In one or more embodiments, the performing of the grading on the at least one supplemental material may include grading the at least one supplemental material while maintaining at least one of a curvature of an outline of the 2D pattern or a length ratio of a sewing line of the 2D pattern, based on the grading information of the at least one polygon.

In one or more embodiments, the calculating of the 3D strain information may include calculating the 3D strain information by mapping a deformation between the 3D source avatar and the 3D target avatar in a corresponding mesh unit.

In one or more embodiments, the calculating of the 3D strain information may include determining a mapping relationship between a deformed portion in which the deformation between the 3D source avatar and the 3D target avatar is present, and a pattern piece of the 2D pattern corresponding to the deformed portion, and calculating the 3D strain information based on the determined mapping relationship.

In one or more embodiments, when the at least one supplemental material is applied to a curved line of the 2D pattern, the calculating of the 2D strain information may include calculating the 2D strain information in a tangential direction to the curved line of the 2D pattern.

In one or more embodiments, the grading method may further include at least one of receiving, as an input, group settings for buttons or buttonholes among the at least one supplemental material, or receiving, as an input, a selection from a user for the supplemental material. The selection may be for at least one of a distance from the outline of the 2D pattern to a buttonhole set as a group along with a button, a start point and end point in the 2D pattern at which the buttonhole is generated, a direction in which the buttonhole is generated in the 2D pattern, a number of buttonholes generated in the 2D pattern, an interval between the buttonholes, a property of the buttonholes, or a style of the buttonholes.

In one or more embodiments, the grading method may further include applying at least one supplemental material graded by the grading information of the at least one polygon to a 2D pattern graded by the grading information of the at least one polygon.

In one or more embodiments, the performing of the grading on the supplemental material may include determining whether the at least one supplemental material is of a type that requires scaling, determining whether there are preset standards for the at least one supplemental material, and selecting a standard from among the standards based on a size of a scaled supplemental material based on a result of the determining.

In one or more embodiments, the grading method may further include receiving, as an input, settings for whether to apply the grading to each type of the at least one supplemental material.

In one or more embodiments, to grading apparatus including a user interface configured to receive, as an input, a selection of a 3D source avatar, a 3D target avatar, and at least one supplemental material, from a user, a processor configured to calculate 3D strain information between the 3D source avatar and the 3D target avatar, calculate 2D strain information of a 2D pattern corresponding to source clothes draped over the 3D source avatar based on the 3D strain information, determine grading information for grading the 2D pattern to correspond to the 3D target avatar based on the 2D strain information, identify at least one supplemental material included in the source clothes, determine at least one polygon matching the at least one supplemental material among a plurality of polygons modeling the 2D pattern, and perform grading on the at least one supplemental material based on grading information of the at least one polygon, and an output device configured to output a result of applying the at least one supplemental material graded by the grading information of the at least one polygon to the 2D pattern graded by the grading information of the at least one polygon.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
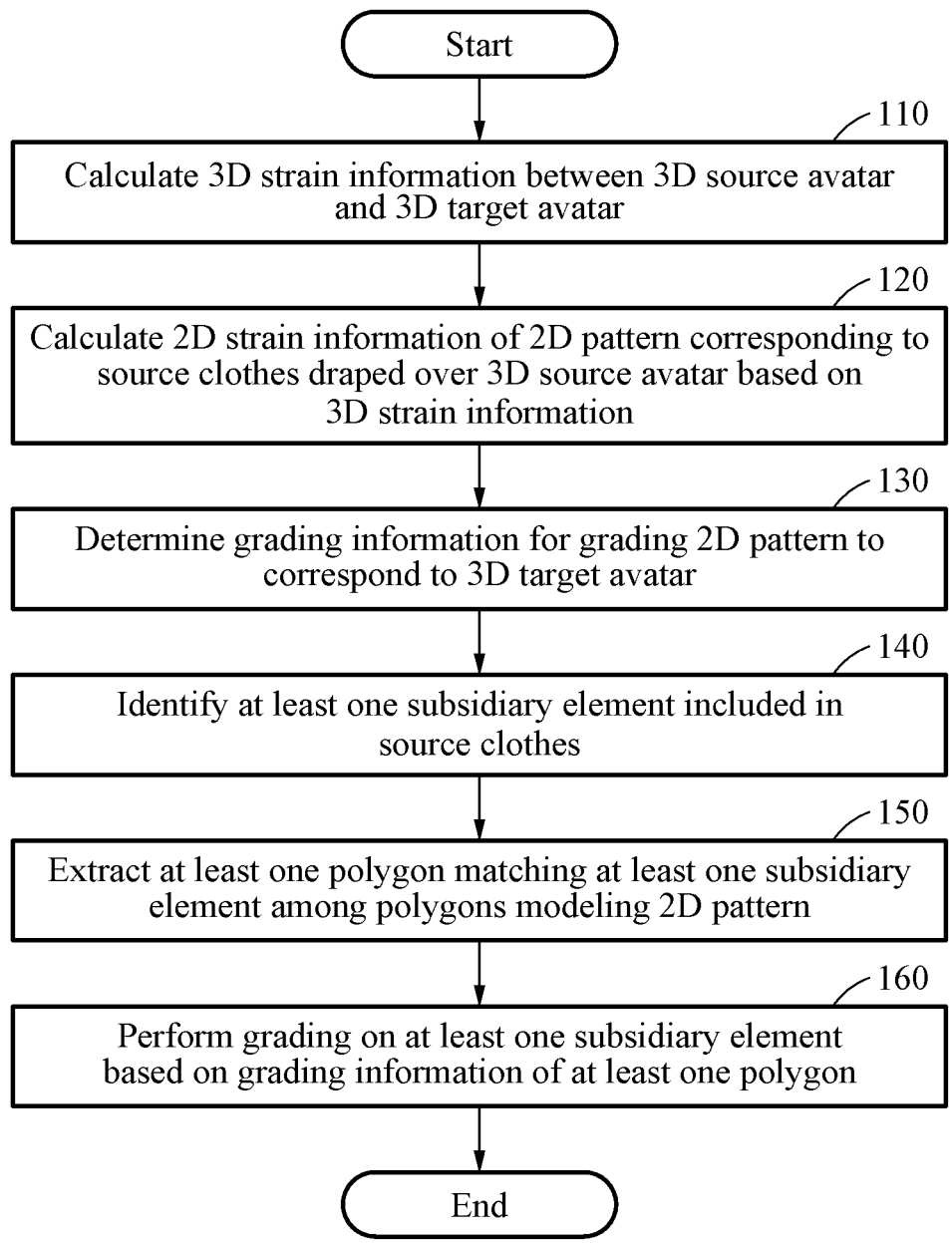
FIG. 1 is a flowchart illustrating a grading method for garments that includes a supplemental material, according to an example embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

Furthermore, in describing embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

As described herein, "grading" refers to generating patterns of different sizes based on an original pattern of a single size. A target pattern of a newly generated size should be designed to fit a target avatar. To that end, a source pattern should also be deformed to the size of a target pattern in line with deformation of the target avatar relative to a source avatar. However, because each body portion of the target avatar is deformed relative to a corresponding body portion of the source avatar, accurate target patterns suitable for the target avatar may not be generated when different deformation of body portions is not taken into account. In one or more embodiments, a source pattern may deform in size for each body portion in line with different degrees of deformation in each body portion. Hence, more accurate target patterns for the target avatar may be made.

As described herein, a "source avatar" refers to a virtual 3D object draped with an original garment that is to be automatically graded.

As described herein, "a target avatar" corresponds to a virtual 3D object that is to be draped with a garment automatically graded from the original garment. The target avatar has at least one body portion that is dimensioned differently from the source garment.

A body type of a source avatar or a target avatar may be classified into features indicated in a physique according to height and/or weight and may include, for example, a skinny body type, a standard body type, an upper body obesity body, a lower body obesity type, an upper and lower body obesity type, a skinny fat body type, or the like. The body type of the source avatar or the target avatar may be determined based on, for example, a body size of a target to wear the source garment made by clothing patterns or a body size of an average person according to race, age, and/or gender.

FIG. 1 is a flowchart illustrating a grading method for a garment that includes a supplemental material according to an example embodiment. Referring to FIG. 1, in operation 110, a grading apparatus for garments including supplemental materials (hereinafter simply "grading apparatus") calculates three-dimensional (3D) strain information between a 3D source avatar and a 3D target avatar.

The source avatar and the target avatar may include properties such as a body size, location coordinates of each body portion, and feature points. The "feature points" may correspond to points on a 3D avatar, which are important locations when a virtual garment is draped over the 3D avatar. The feature points may correspond to at least one of, for example, both arms, both wrists, left and right bodies, both shoulders, a head, a neck, both legs, left and right lower bodies, both ankles, an armpit, a groin, a pelvis, a hip, a stomach, a chest, both hands, both feet, both elbows, both knees, both fingertips, between both fingers, the back of both hands, the top of both feet, the tips of both toes, and both heels of the 3D avatar.

Figure 3:
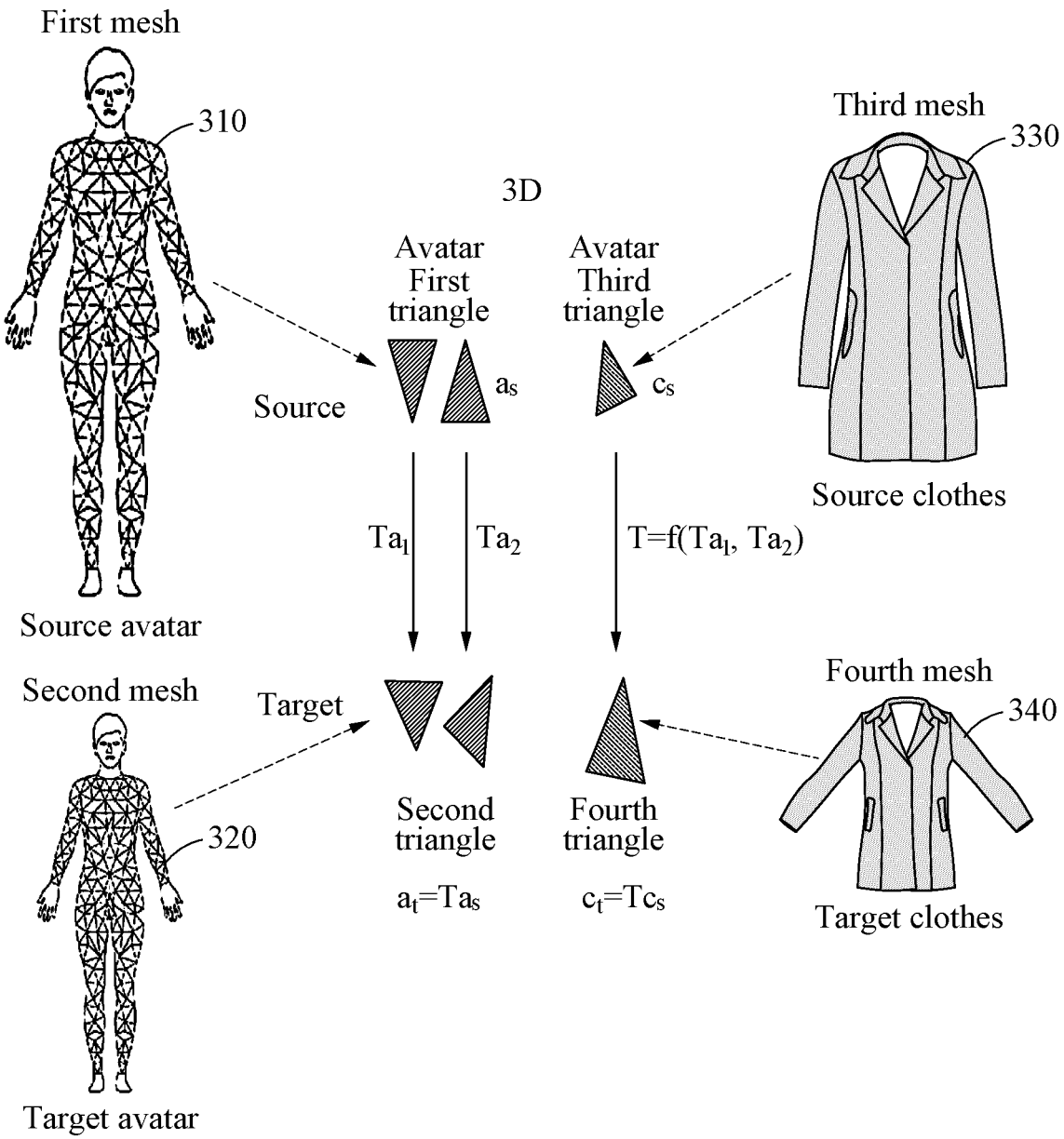
FIG. 3 is a diagram illustrating an example of deforming a polygon of source garments into a polygon of target garments, according to an example embodiment.

The source avatar and/or the target avatar may be modeled with, for example, a mesh of a unit figure as shown in FIG. 3, for example. In some cases, the unit figure may be a 3D polyhedron (e.g., a tetrahedron). Hereinafter, for the convenience of description, the description assumes that the unit figure included in a mesh is a polygon which is particularly a triangle. A mesh constituting the source avatar is referred to as a first mesh, and a triangle included in the first mesh is referred to as a first triangle. Similarly, a mesh constituting the target avatar is referred to as a second mesh, and a triangle included in the second mesh is referred to as a second triangle.

The grading apparatus may calculate 110 the 3D strain information by mapping a deformation between the 3D source avatar and the 3D target avatar in a corresponding mesh unit. The 3D strain information may be construed as a deformation degree, for example, how much each body portion of the source avatar is deformed in the target avatar.

For example, the grading apparatus may calculate the 3D strain information based on a unit triangle constituting a mesh of an avatar. The unit triangle described herein may correspond to the first triangle constituting the first mesh of the source avatar and/or the second triangle constituting the second mesh of the target avatar. That is, the grading apparatus may calculate the 3D strain information based on a difference between the first triangle and the second triangle. Hereinafter, how the grading apparatus calculates the 3D strain information will be described in greater detail with reference to FIGS. 2A and 2B.

Then, the grading apparatus calculates 120 two-dimensional (2D) strain information of a 2D pattern corresponding to the source garments draped over the 3D source avatar based on the 3D strain information. The source garments refer to garments draped over the 3D source avatar, which may also be virtual 3D garments. The target garments refer to garments draped over the 3D target avatar, which may also be virtual 3D garments. The source garments and the target garments may be modeled with a polygon mesh of which a plurality of vertices are connected to one another. Hereinafter, a mesh constituting the source garments will be referred to as a third mesh, and a triangle included in the third mesh will be referred to as a third triangle. In addition, a mesh constituting the target garments will be referred to as a fourth mesh, and a triangle included in the fourth mesh will be referred to as a fourth triangle.

In an embodiment, sizes of triangles of a mesh (e.g., the third mesh or the fourth mesh) constituting a 3D virtual garment may be different for each body portion or all of the triangles may of the same size.

A 3D garment such as the source garment 120 and the target garment 140 may be composed of clothing patterns corresponding to respective body portions. Clothing patterns according to an embodiment may be virtual 2D clothing patterns 810 and 830 as shown in FIG. 8, which are modeled with triangles.

The mesh according to an embodiment may be modeled in various manners. For example, vertices of a polygon included in the mesh may be point masses, and sides of the polygon may be represented as springs having elasticity, which connect the point masses. Thus, the clothing patterns according to an embodiment may be modeled by, for example, a mass-spring model. The springs may have respective resist values depending on properties of used fabric, for example, for stretch, shear, and bending. Alternatively, the mesh may be modeled as a strain model. A polygon included in the mesh may be modeled as a triangle or may be modeled as a polygon greater than or equal to a quadrangle. In some cases, when a 3D volume should be modeled, the mesh may be modeled with a polyhedron.

Vertices included in the mesh may move according to an action caused by an external force, such as gravity, and an internal force, such as stretch, shear, and bending. When a force being applied to each vertex is obtained by calculating the external force and the internal force, a speed of displacement and motion of each vertex may be obtained. Motion of the virtual garment may be simulated through motion of vertices of a polygon of the mesh in each time step. When 2D virtual clothing patterns composed of polygon meshes are draped over a 3D avatar, the 3D virtual garment of a natural appearance based on the laws of physics may be implemented.

Vertices included in the mesh may move according to action of an external force such as gravity, and an internal force such as stretch, shear, and bending. When a force being applied to each vertex is obtained by calculating the external force and the internal force, a speed of displacement and motion of each vertex may be obtained. Motion of virtual garments may be simulated through motion of vertices of the polygon of the mesh in each time step. When a 2D pattern formed with a polygon mesh is draped over a 3D avatar, virtual 3D garments of a natural appearance based on the laws of physics may be implemented.

Although, when performing grading, a volume or shape between the source avatar and the target avatar may change, a connection relationship between meshes respectively included in the avatars and/or the number of triangles constituting the meshes may remain the same.

Hereinafter, for convenience of description, 2D clothing patterns constituting a source garment are referred to as "source patterns," and 2D clothing patterns constituting a target garment are referred to as "target patterns." A mesh constituting source patterns is referred to as a "fifth mesh" or "source pattern mesh," and a triangle included in the fifth mesh is referred to as a "fifth triangle" or "source pattern polygon." Furthermore, a mesh constituting target patterns is referred to as a "sixth mesh" or "target pattern mesh," and a triangle included in the sixth mesh is referred to as a "sixth triangle" or "target pattern polygon."

Hereinafter, how the grading apparatus calculates the 2D strain information of the 2D pattern will be described in detail with reference to FIGS. 3, 4A and 4B. The grading apparatus determines 130 grading information for grading the 2D pattern to correspond to the 3D target avatar based on the 2D strain information.

The grading method may automatically grade a pattern of the target garments such that the source garments draped over the source avatar fit the target avatar which is difference in size and/or body type from the source avatar. Hereinafter, how the grading apparatus determines the grading information will be described in greater detail with reference to FIG. 5.

The grading apparatus identifies 140 at least one supplemental material included in the source garments. The supplemental material may be, for example, buttons, buttonholes, a graphic image, a zipper and the like that are attached to the 2D pattern, and various graphic data and/or texture data used to edit the 2D pattern or the supplemental materials attached to the 2D pattern. The supplemental material may be a first type that has properties like graphic property, a second type that represents an editing property, or a third type that has a line property. The graphic property refers to a property that may deform a supplemental material using graphics.

When performing grading on a supplemental material of the first type, the grading apparatus may consider scaling in addition to a change in the position of the supplemental material. The first type of supplemental material may include, for example, buttons, buttonholes, a zipper, a rubber band, a stich, binding, piping, and the like, in addition to materials including, for example, print, logo, embroidery, characters, fabric, and the like.

Piping may refer to sewing by rolling along an edge (or corner) of a female bag, for example, and it may have both standardized and/or non-standardized properties. A zipper may be graphically deformed in length and width without restriction, but may be standardized in practice. Thus, when performing grading on a zipper, the grading apparatus may automatically select and recommend a size that is the most similar to a standard configuration, or change the size of the zipper to a size that is similar to the standard configuration.

Buttons and buttonholes may be set as a single group by a user. For example, when five buttons and five buttonholes are attached to a front surface of a pattern piece of a 2D pattern, the five buttons may be set as a single button group and the five buttonholes may be set as a single buttonhole group. In this example, each of the buttonholes may be indicated as a graphic image on the 2D pattern, and thus correspond to the first type of supplemental material. In addition, the buttonhole group or the button group may correspond to the third type supplemental material having the line property because the buttonholes or the buttons in the buttonhole group or the button group are disposed along an outline of the 2D pattern. As described above, a supplemental material may correspond to one type or a plurality of types.

A zipper may be indicated as zipper lines on both sides of a 2D pattern, and a length of a zipper line may be parameterized, for example, by a factor of 0.9 or 0.7 from a length of the 2D pattern. The parameterized size of the zipper is changed as the garment is graded. The grading apparatus may determine scaling values that are vertical to the zipper line and use the average of the scaling values to determine the width of the zipper. For example, when there is a standard for the zipper, the grading apparatus may grade the zipper which is a supplemental material based on a zipper of the standard having the most similar length and width to the length and width calculated by the scaling in the direction vertical to the zipper line. That is, a plurality of standard zipper configurations are stored and compared with the scaled zipper configuration to select an appropriate standard zipper configuration.

The editing property may be a property that is temporarily set for editing a pattern piece. The second type supplemental material may include, for example, a pin, a trim, a tack, a measure, reference line settings, and the like. A pin may be indicated as one point on a 2D pattern or a pattern piece. When a user sets a pin on a 2D pattern or a pattern piece, the grading apparatus may move a coordinate of a polygon of a mesh matching the pin when grading. A trim may allow a 3D object to be positioned at one point on 3D garments. When trimming, a junction may not be a center of the 3D object, or be a plurality of points. A tack may temporarily connect two points selected on 3D garments and fix them. Tacking may be performed as a user selects points through a pin or others. The grading apparatus may move a polygon of a mesh corresponding to each of the points selected by the tack. A measure may measure a length of a reference line that is formed by two or more consecutive points on 3D garments or a 2D pattern. A button group may set or edit a position of a button or buttonhole at one point on 3D garments. For the editing property, only a change in position may be considered when grading a supplemental material.

The line property may correspond to a property of being parameterized to a line of a 2D pattern or a pattern piece of the 2D pattern for setting. The third type supplemental material may include, for example, a button or buttonhole group, a zipper, binding, piping, or the like. The button and/or buttonhole group may have a certain distance from an outline of a 2D pattern and be deformed in a tangential direction of a mesh of the outline of the 2D pattern, and thus, corresponds to the third type supplemental material. The button and/or buttonhole group may be scaled identically or differently along a single scale axis.

Figure 14:
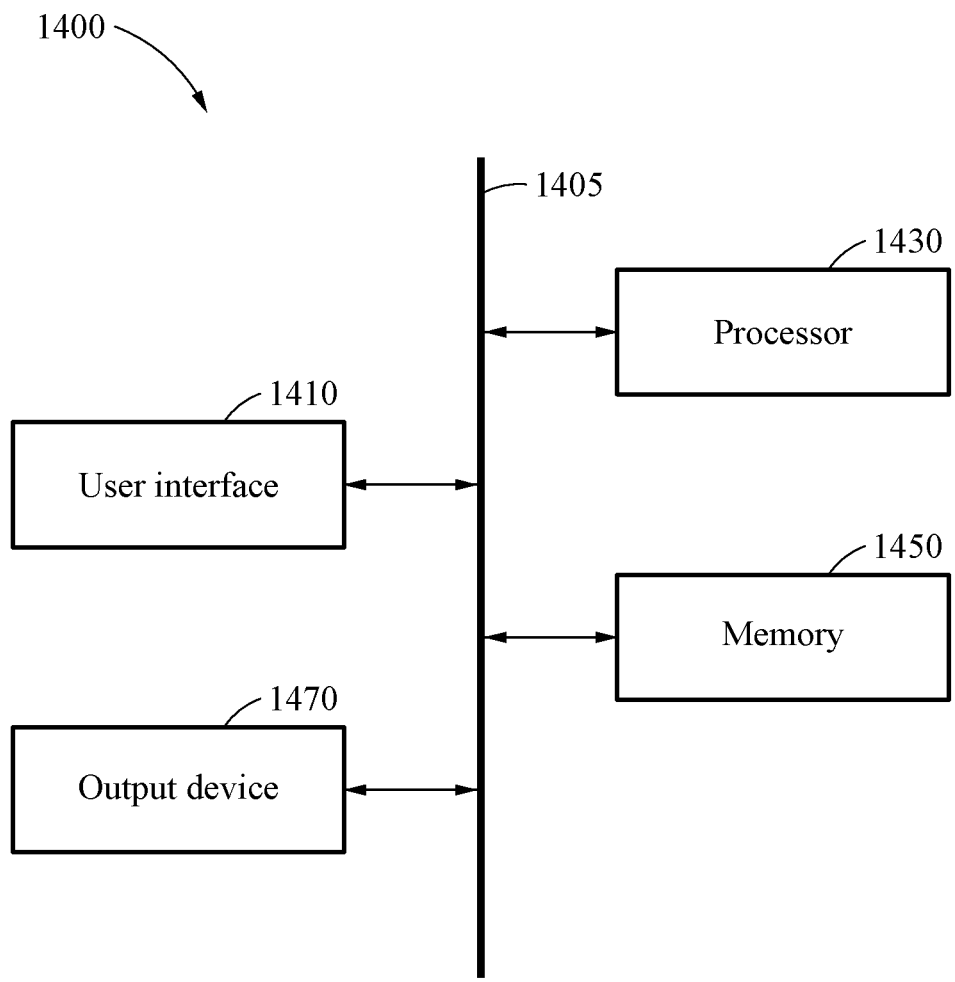
FIG. 14 is a diagram illustrating an example of a grading apparatus for garments including a supplemental material, according to an example embodiment.

In one or more embodiments, at least one supplemental material may be configured by a user through a user interface, for example, a user interface 1410 of FIG. 14 generated by the grading apparatus. The grading apparatus may receive, as an input, group settings for buttons or buttonholes among the at least one supplemental material from the user through the user interface. In addition, the grading apparatus may receive, from the user, a user selection for a supplemental material. The user selection may be for at least one of a distance from an outline of a 2D pattern to a buttonhole, a start position and an end point of the 2D pattern at which the buttonhole is generated, a direction in which the buttonhole is generated, a total number of buttonholes generated on the 2D pattern, an interval between the buttonholes, a property of the buttonholes, or a style of the buttonholes.

The grading apparatus determines 150 at least one polygon matching the at least one supplemental material among a plurality of polygons modeling the 2D pattern. For example, the grading apparatus may determine the at least one polygon matching the at least one supplemental material among the polygons modeling the 2D pattern for each of the at least one supplemental material. Determining of at least one polygon for each supplemental material is described below in detail with reference to FIGS. 6 through 13.

The grading apparatus performs 160 grading on at least one supplemental material based on grading information of the determined at least one polygon. For example, the grading apparatus may perform the grading on each of the at least one supplemental material based on the grading information of the at least one polygon. The grading information of the at least one polygon may correspond to a portion of the grading information of the 2D pattern, which corresponds to the grading information of the at least one polygon matching the at least one supplemental material. For example, when a supplemental material is on a curvature of a 2D pattern, the grading apparatus may calculate strain information in a tangential direction of the curvature, and adjust a width of the 2D pattern to which the supplemental material is applied based on an average of the 3D strain information of the target avatar. Alternatively, the grading apparatus may grade the at least one supplemental material while maintaining at least one of a curvature of an outline of the 2D pattern or a length radio of a sewing line of the 2D pattern, based on the grading information of the at least one polygon. The grading apparatus applies 160 at least one supplemental material graded based on the grading information of the at least one polygon to a 2D pattern graded by the grading information of the at least one polygon, and outputs a result of the applying.

In one or more embodiments, the grading apparatus may receive, as an input, settings for whether to apply the grading to the at least one supplemental material for each type of the at least one supplemental material. When a setting configuration for applying the grading to a supplemental material is set to "OFF" by a user, the grading apparatus may maintain an original size of the supplemental material. In this example, the grading apparatus may apply the supplemental material of which the original size is maintained to the 2D pattern graded by the grading information. In contrast, when the same is set to "ON" by the user, the grading apparatus may perform scaling on the supplemental material, or change a size and a position of the supplemental material based on the grading information of the 2D pattern. In this case, the grading apparatus may apply a supplemental material obtained by performing the grading based on the grading information to the 2D pattern obtained by performing the grading based on the grading information, and then output a 2D pattern including the supplemental material and/or 3D garments including the supplemental material. According to an example, the grading apparatus may also receive, as an input, settings for whether to apply a curvature of the 2D pattern in addition to a size and a position of the supplemental material when performing the grading.

Figure 2A:
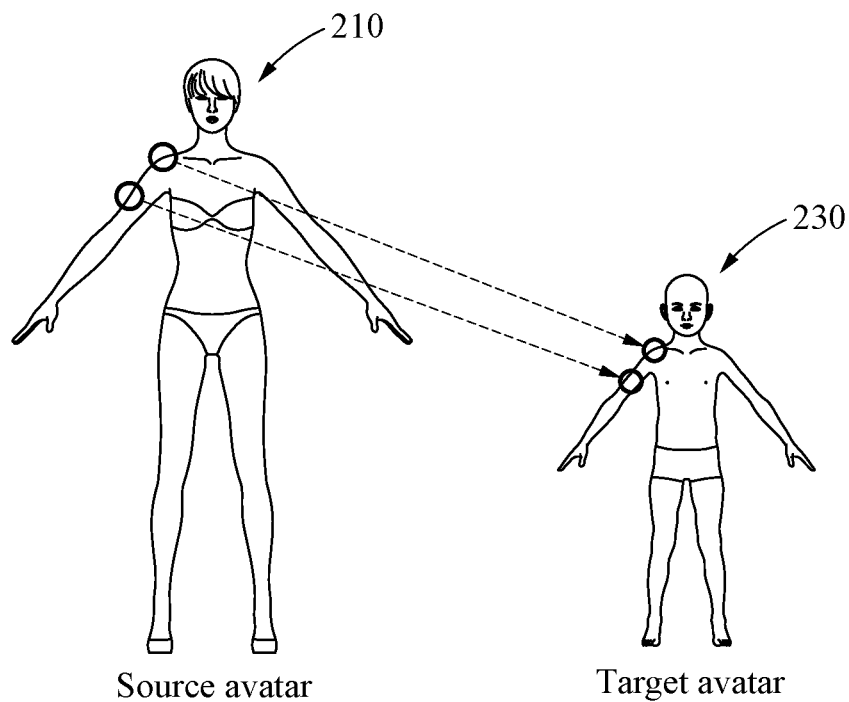
FIGS. 2A and 2B are diagrams illustrating calculating of three-dimensional (3D) strain information, according to an example embodiment.
Figure 2B:
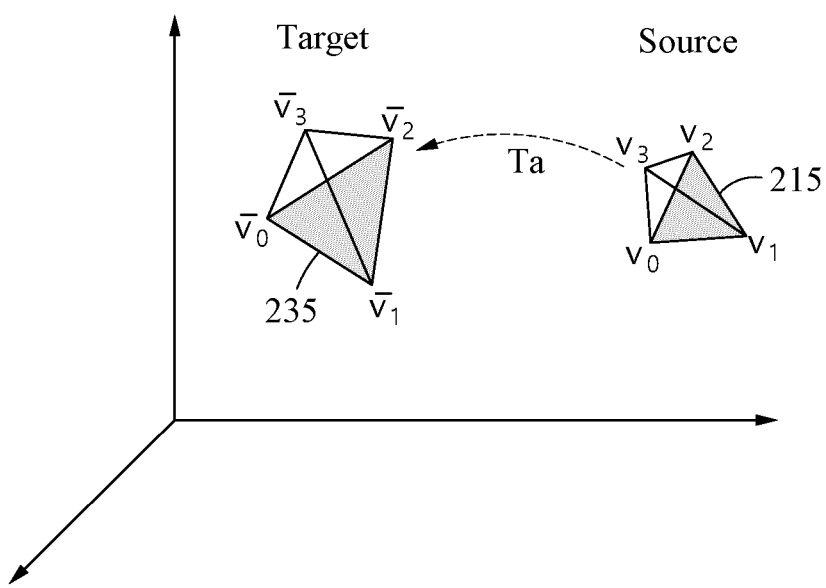

FIGS. 2A and 2B are conceptual diagrams illustrating a first strain between a 3D source avatar and a 3D target avatar, according to an embodiment. Referring to FIG. 2A, a body portion of a 3D source avatar 210 and a body portion of a 3D target avatar 230 corresponding to the body portion of the 3D source avatar 210 are illustrated. Referring to FIG. 2B, a first triangle 215 of a first mesh constituting the 3D source avatar 210, and a second triangle 235 of a second mesh constituting the 3D target avatar 230 are illustrated.

A strain, or a strain rate, between the body portion of the source avatar 210 and the body portion of the target avatar 230 may be defined by each triangle unit constituting a mesh of each avatar. A method of calculating how much each triangle of the source avatar 210, for example, the first triangle 215, is deformed in the target avatar 230 may correspond to avatar fitting.

According to an example embodiment, the grading apparatus may determine a feature point of the target avatar 230 into which a certain feature point of the source avatar 210 fits, and determine positions in the target avatar 230 to which three points of the first triangle 215 of the source avatar 210 move. The grading apparatus may calculate a 3D transformation matrix which indicates a deformation degree of a triangle, based on the positions in the target avatar 230 to which the three points of the first triangle 215 of the source avatar 210 move.

For example, it is assumed that locations (v0, v1, v2) of the three points of the first triangle 215 of the source avatar 210 and locations ($\bar{v}0$, $\bar{v}1$, $\bar{v}3$) of three points of three points of the second triangle 235 of the target avatar 230.

The grading apparatus may form a tetrahedron by expanding the first triangle 215 and the second triangle 235. The grading apparatus may form a first tetrahedron V based on the three points of the first triangle 215 and a second tetrahedron $\bar{V}$ based on the three points of the second triangle 235. The first tetrahedron V may be represented as V=[v1−v0, v2−v0, v3−v0], and the second tetrahedron $\bar{V}$ may be represented as $\bar{V}$=[$\bar{v}1$−$\bar{v}0$, $\bar{v}2$−$\bar{v}0$, $\bar{v}3$−$\bar{v}0$]. In this case, one point v3 of the first tetrahedron V and one point $\bar{v}3$ of the second tetrahedron $\bar{V}$ may be positioned on a place vertically away from the midpoint of each triangle by $\sqrt{2 \times \text{trianglearea}}$. As such, when the first tetrahedron V corresponding to the first triangle 310 and the second tetrahedron $\bar{V}$ corresponding to the second triangle 330 are given, the automatic grading device may obtain a transformation matrix Ta indicating a deformation degree between the first tetrahedron V and the second tetrahedron $\bar{V}$ as Equation (1):

$$\bar{V} = TaV; Ta = V\bar{V}^{-1} \qquad (1)$$

The automatic grading device may calculate a strain ("first strain") between the source avatar and the target avatar using the transformation matrix Ta.

According to an embodiment, the automatic grading device may calculate a strain between the source avatar and the target avatar using a correspondence map between a first mesh of the source avatar and a second mesh of the target avatar. In this case, the correspondence map may be calculated proportionally on the basis of, for example, a feature point such as the tip of the head of each avatar, the tip of the tiptoe of each avatar, or the tip of the arm of each avatar.

According to an embodiment, the automatic grading device may obtain a correspondence map by dressing the source avatar and the target avatar in a virtual reference garment having the same mesh topology. The virtual reference garment may be a virtual garment draped in intimate contact with the body of an avatar. The correspondence map may include information indicating triangle(s) of the second mesh of the target avatar, which correspond to triangle(s) of the first mesh of the source avatar. Because of dressing the source avatar and the target avatar in the virtual reference garment of the same mesh topology, triangle(s) of the second mesh of the target avatar, which correspond to triangle(s) of the first mesh of the source avatar, may be identified. For example, unique identifiers may be assigned to triangles included in the virtual reference garment. Because the identifiers of the triangles included in the virtual reference garment are not varied after the virtual reference garment are draped over the source avatar and the target avatar, a correspondence relationship between a triangle of the source avatar and a triangle of the target avatar, which have the same identifier, may be easily identified.

The grading apparatus may determine a body portion of the source avatar 210 to which each portion of a source pattern constituting source garments is mapped. For example, the grading apparatus may determine a mapping relationship by searching a mapping list in which each triangle of a mesh constituting the source garments to triangles of a mesh of the source avatar 210 that are close to each triangle of the mesh constituting the source garments. The mapping relationship may indicate a body portion of the source avatar 210 mapped to each portion of a pattern of virtual 3D garments corresponding to the source avatar 210. When the source garments are draped over the source avatar 210, the grading apparatus may determine a mapping relationship between a target pattern of a 2D source pattern constituting the source garments and a body portion of the source avatar 210.

The grading apparatus may determine a mapping relationship between a deformed portion in which the deformation between the 3D source avatar 210 and the 3D target avatar 230 is present and a pattern piece of the 2D pattern corresponding to the deformed portion, and calculate the 3D strain information based on the determined mapping relationship.

For example, the grading apparatus may determine a mapping relationship between a source pattern and a target pattern.

For example, when the target pattern is a sleeve pattern corresponding to a right arm, or a right shoulder in detail, of the source avatar 210, the grading apparatus may search for first triangles adjacent to each of triangles constituting a mesh of the sleeve pattern of source garments from among first triangles constituting the first mesh of the source avatar 210. In this example, the grading apparatus may search for the adjacent first triangles located within a certain distance from three points of each of the triangles constituting the mesh of the sleeve pattern. The grading apparatus may register the adjacent first triangles in a mapping list corresponding to the sleeve pattern. The mapping list corresponding to a certain triangle of the source garments may include a single first triangle, or a plurality of first triangles, for example. The mapping list corresponding to a triangle of the source garments may include first triangles in a certain area and/or first triangles in a certain direction. The grading apparatus may determine a mapping relationship by a corresponding body portion (e.g., the right shoulder) of the source avatar 210 based on the mapping list. The grading apparatus may convert a 2D source pattern constituting the source garments into a 2D target pattern constituting target garments, based on the 3D strain information and the mapping relationship.

Subsequently, the grading apparatus may determine grading information for grading the 2D pattern such that the 2D pattern corresponds to the 3D target avatar 230 based on 2D strain information, and convert the source garments into the 3D target garments to be draped over the target avatar 230 by the grading information. Hereinafter, how the grading apparatus converts source garments into target garments by grading information will be described in greater detail with reference to FIGS. 3 through 5.

In addition, the grading apparatus may deform a portion of a target pattern mapped to a corresponding body portion of the target avatar 230 by a strain, or a strain rate, of each body portion of the target avatar 230. The grading apparatus may also perform grading on the target pattern through an optimization process such that the entire target pattern of the target garments maintains an outline curvature and/or a sewing line length ratio of the source pattern, and the like.

Figure 4A:
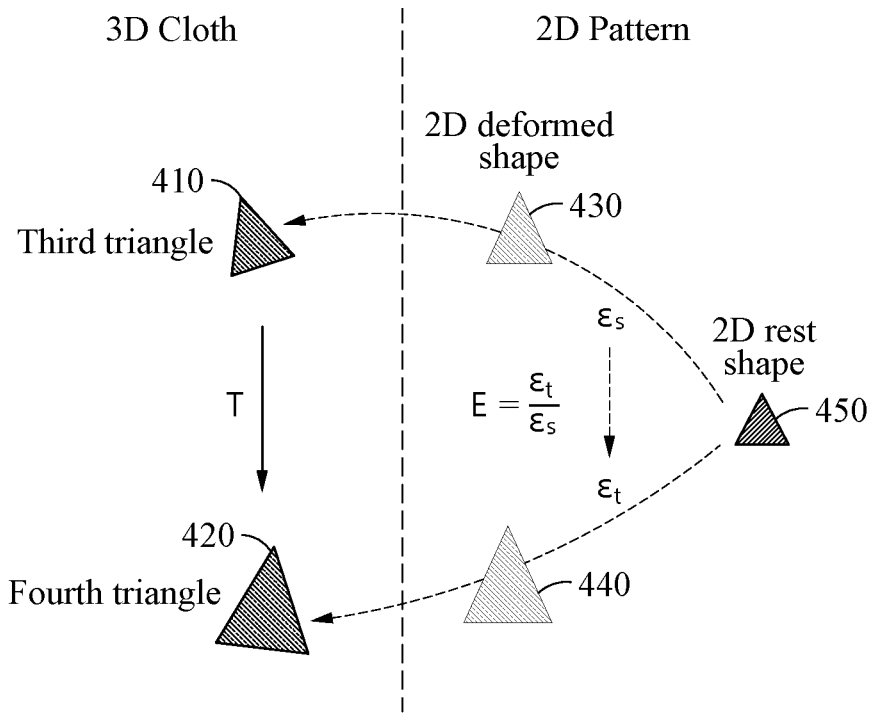
FIGS. 4A and 4B are diagrams illustrating an example of calculating two-dimensional (2D) strain information, according to an example embodiment.
Figure 4B:
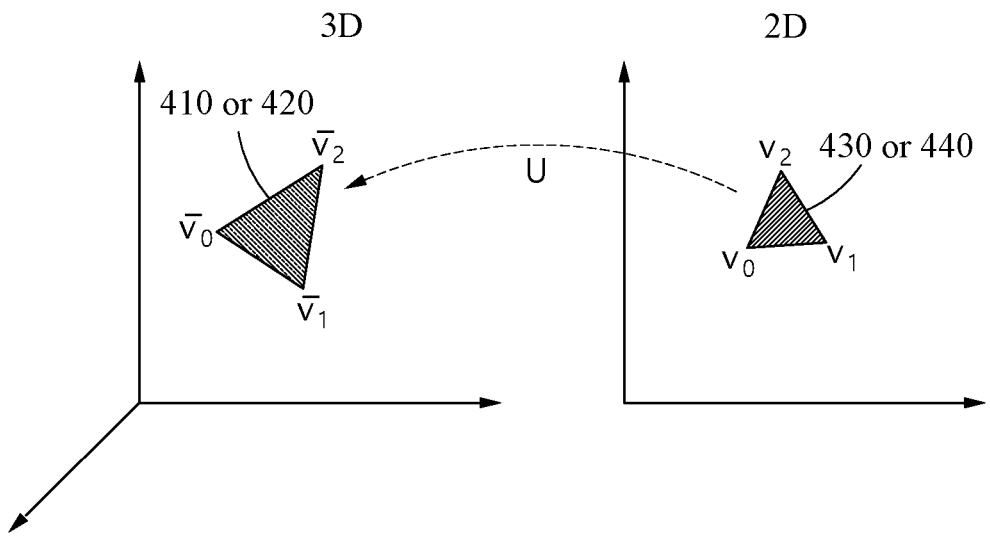

FIGS. 3, 4A and 4B are diagrams illustrating an example of calculating 2D strain information of a 2D pattern. Referring to FIG. 3, a process of deforming a polygon of a mesh constituting source garments into a polygon of a mesh constituting target garments is illustrated.

The grading apparatus may deform a third triangle of source garments 330 into a fourth triangle of target garments 340 based on 3D strain information associated with a deformation from first triangles of a body portion of a source avatar 310 to second triangles of a body portion of a target avatar 320.

Due to the principle of grading, garments may follow size deformation of an adjacent body portion of an avatar. Thus, the grading apparatus may calculate a deformation of a triangle of a mesh constituting the source garments 330 based on strains, or strain rates, of the first triangles of the body portion of the source avatar 310, which are mapped (e.g., adjacent) to the third triangle of a third mesh constituting the source garments 330.

The strains of the first triangles of the body portion of the source avatar 310 may correspond to 3D strain information between the source avatar 310 and the target avatar 320 that is represented as a transformation matrix $T_a$ as represented by Equation 1 above. In this case, strains $T_{a1}$ and $T_{a2}$ between the source avatar 310 and the target avatar 320 may be applied as a strain, $T=f(T_{a1}, T_{a2})$, between the source garments 330 and the target garments 340 as illustrated in FIG. 3.

For example, when any one of the first triangles constituting the first mesh of the source avatar 310 is represented as $a_s$, a second triangle $a_t$ constituting the second mesh of the target avatar 320 may be represented as $T_a \times a_s$. In addition, when any one of the third triangles constituting the third mesh of the source garments 330 is represented as $c_s$, a fourth triangle $c_t$ constituting the fourth mesh of the target garments 340 may be represented as $T \times c_s$. $T=f(T_{a1}, T_{a2})$ may correspond to an average of the strains $T_{a,i}$ of the first triangles as in Equation (2) set forth below.

For example, it is assumed that a set of first triangles of a body portion of the source avatar 310, which are mapped to a third triangle r of the third mesh constituting the source garments 330, is $Lr \in \{t_0, t_1, \ldots, t_n\}$. In this case, a strain $T_c$ of the third triangle of the third mesh constituting the source garments 330 may be calculated as an average of the strains $T_{a,i}$ of the first triangles of the body portion of the source avatar 310 as represented by Equation (2) below.

$$T_c = \sum_{i=0}^{n-1} T_{a,i}/n \qquad (2)$$

where the strains $T_{a,i}$ of the first triangles of the body portion of the source avatar 610 may correspond to a value obtained by excluding rotation rigid transformation from Equation (1) above, that is, the result of performing only scale transformation and shear angle transformation.

As described above, the grading apparatus may calculate statistics (e.g., an average) of sets of 3D strain information of the first triangles of the body portion of the source avatar 310 and may deform the third triangle of the third mesh constituting the source garments 330 into the fourth triangle of the fourth mesh constituting the target garments 340 based on the statistics of the sets of the 3D strain information.

The grading apparatus may apply a transformation matrix of the source avatar 310 to the target garments 340 without change to accurately reflect, in the target garments 340, a vertical-direction deformation of the source avatar 310 as well as a horizontal-direction deformation of the source avatar 310, thereby accurately generating an automatically graded target pattern irrespective of a shape of garments.

Referring to FIG. 4A, when deforming a third triangle 410 of 3D source garments into a fourth triangle 420 of 3D target garments, a relationship between a fifth triangle 430 of a 2D source pattern (a fifth mesh) that corresponds to the third triangle 410 and a sixth triangle 440 of a 2D target pattern (a six mesh) that corresponds to the fourth triangle 420 is illustrated.

A 3D shape of garments may be deformed due to, for example, gravity, a collision between a cloth and a cloth, fabric tension, or the like. Such a deformation of garments may need to be reflected in a 2D pattern that constitutes the garments to generate a 2D pattern or pattern pieces of the 2D pattern that fit an avatar well. Thus, the deformation of the 3D shape of the garments may also be applied to the 2D pattern that constitutes the garments.

For example, a shape strain between a reference triangle 450 and the fifth triangle 430 of the source pattern is referred to as a source strain $\varepsilon_s$, and a shape strain between the reference triangle 450 and the sixth triangle 440 of the target pattern is referred to as a target strain $\varepsilon_t$. In this example, the fifth triangle 430 may correspond to a triangle of the source pattern (the fifth mesh) that corresponds to the third triangle 410. In addition, the sixth triangle 440 may correspond to a triangle of the target pattern (the sixth mesh) that corresponds to the fourth triangle 420. Moreover, the reference triangle 450 may correspond to a virtual triangle that is a criterion on a 2D pattern and may correspond to, for example, a triangle of an ideal state in which any external force is not applied. Such a reference triangle may have a predetermined initial size or have an average size of a unit triangle of each pattern depending on a design.

Referring to FIG. 4B, a relationship between a triangle 410 or 420 constituting 3D garments and a triangle 430 or 440 constituting a 2D pattern is illustrated.

The source strain $\varepsilon_s$ and the target strain $\varepsilon_t$ may be calculated as represented by Equation (3) below.

$$V=[v1-v0, v2-v0], \bar{V}=[\bar{v}1-\bar{v}0, \bar{v}2-\bar{v}0], U=V\bar{V}^{-1} \quad (3)$$

In Equation (3) above, U may be a 2×3 matrix, and may indicate how much a size of a first column vector of the matrix is scaled on an x-axis and how much a size of a second column vector of the matrix is scaled on a y-axis, in a 2D. In addition, an angle of the two column vectors may correspond to a shear angle.

Since a change in size mainly occurs in the direction of the x-axis and the y-axis when a 2D pattern is graded, the grading apparatus may calculate a strain $\varepsilon=[\varepsilon_x \ \varepsilon_y]$, using only a size of the two column vectors, that is, only a scale value.

According to an example, the grading apparatus may define a strain as $\varepsilon=[\varepsilon_x \ \varepsilon_y \ \theta]$ by including a shear angle in addition to a scale value. In such a case, triangles of a pattern constituting respective garments in the grading process may need to be deformed by the target strain $\varepsilon_t$ from the source strain $\varepsilon_s$.

A rate between the source strain $\varepsilon_s$ and the target strain $\varepsilon_t$ is referred to herein as 2D strain information E. The 2D strain information E may be calculated as $$E = \frac{\varepsilon_t}{\varepsilon_s}.$$

The 2D strain information E may also be represented as an initial rate $E_0$.

Figure 5:
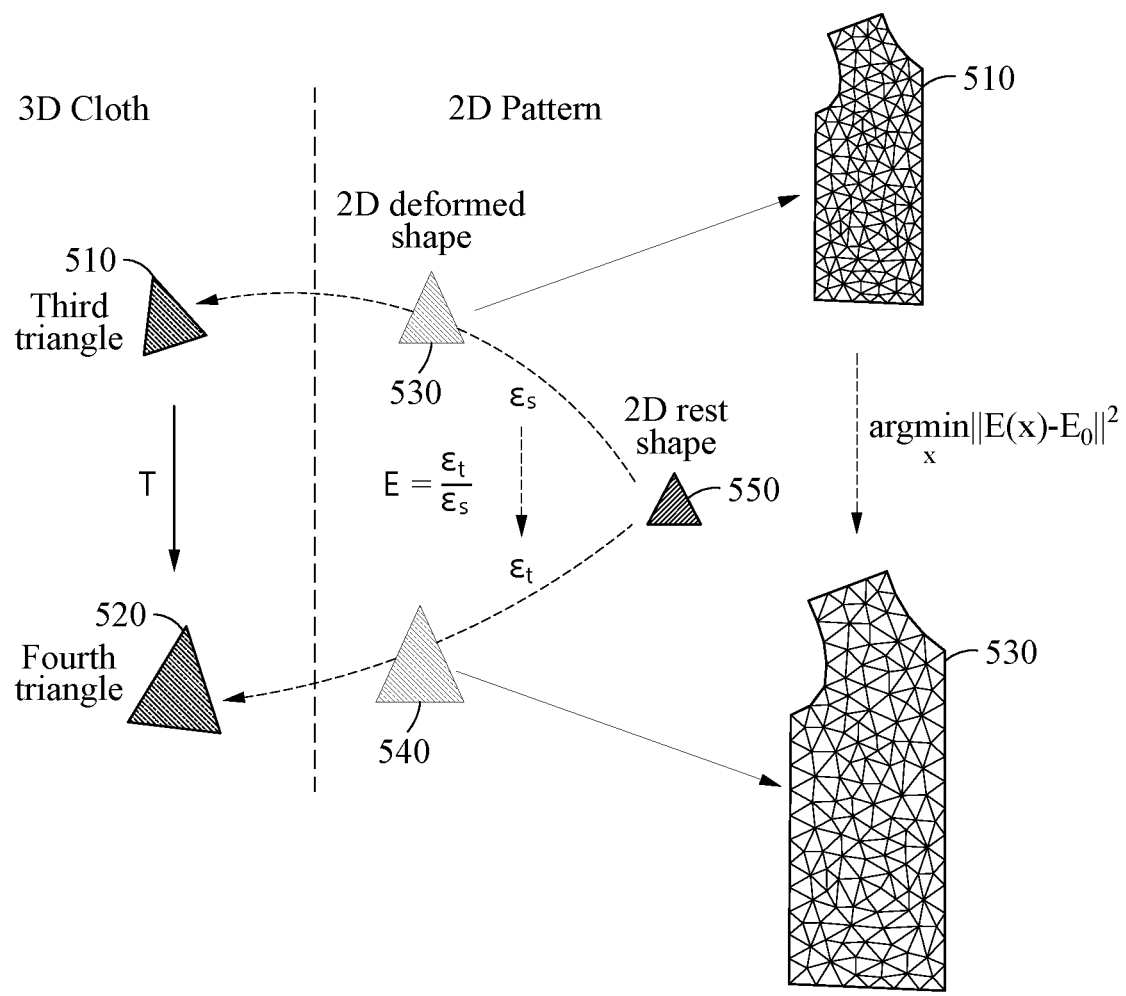
FIG. 5 is a diagram illustrating an example of determining grading information, according to an example embodiment.

FIG. 5 is a diagram illustrating an example of determining grading information according to an example embodiment. Referring to FIG. 5, a process of converting a source pattern constituting source garments into a target pattern constituting target garments based on 2D strain information of a 2D pattern is illustrated.

The grading apparatus may derive a sixth mesh candidate 530 of a 2D target pattern candidate from a fifth mesh 510 of a 2D source pattern based on an objective function that maintains a strain of a 2D pattern.

The grading apparatus may deform an entire triangle mesh constituting the 2D pattern such that a shape of 3D garments is maintained to be maximally the same as in the 2D pattern when the shape of the 3D garments is deformed.

For example, when a sixth triangle candidate of the sixth mesh candidate 530 of the target pattern candidate is determined, the grading apparatus may calculate a target strain between a reference triangle and the sixth triangle candidate. The calculated target strain may correspond to a target strain candidate. The grading apparatus may determine a rate between a source strain and the target strain candidate, which is grading information. The grading apparatus may determine positions of points on the sixth mesh candidate 530 to satisfy a first objective function that minimizes a difference between 2D strain information and the grading information.

Such a process of calculating a position of each point on the sixth mesh candidate 530 of the target pattern candidate to maximally maintain a 2D strain corresponding to a triangle of 3D garments may be referred to as an optimization process. The optimization process may be represented as Equation (4) below.

$$\underset{x}{\mathrm{argmin}} \|E(x) - E_0\|^2 \quad (4)$$

where $x \in R^{2N}$ may correspond to a vector indicating locations of points (e.g., vertices) on the sixth mesh candidate of the 2D target pattern information.

Equation (4) above may correspond to a first objective function that minimizes a difference between 2D strain information $E_0$ and grading information $E(x)$. The grading apparatus may calculate a position of a point on the sixth mesh candidate of the target pattern candidate such that the difference between the 2D strain information $E_0$ and grading information $E(x)$ is minimized.

The grading apparatus may obtain a solution where a gradient of the objective function of Equation (4) above is 0 by a gradient descent technique, for example. The grading apparatus may obtain a 2D target pattern by obtaining the solution of Equation (4) above.

For example, when a target avatar is smaller than a source avatar in terms of a body type, a whole target pattern may more decrease in size than a source pattern. In this example, due to a difference between a target strain of each triangle of a mesh constituting the target pattern and a target strain of a neighboring triangle, outlines of the target pattern may be represented in an uneven manner. This may be caused because strains of triangles of a mesh of the target avatar, which are adjacent to the triangle of the mesh constituting the target pattern, are not consecutive.

The grading apparatus may relax 2D strain information using, for example, Equation 5 below, to smoothly represent the outlines of the 2D pattern as straight lines. The 2D strain information relaxed by Equation 5 below may be represented as $\hat{E}_0$.

$$E_i^{k+1} = \frac{E_i^k + \sum_{j \in S_{adj}} E_{ij}^k}{1 + \text{count}(S_{adj})} \quad (5)$$

where k denotes the iteration of relaxation, and $S_{adj}$ denotes a set of triangles j adjacent to triangle i of the 2D pattern.

The grading apparatus may obtain the relaxed 2D strain information $\hat{E}_0$ of an initial target strain $E_0$ through a relaxation process using Equation (5) above.

According to an example, the grading apparatus may obtain the relaxed 2D strain information $\hat{E}_0$ by applying a moving average, or low-pass filtering, to points corresponding to outlines of the 2D pattern.

The grading apparatus may obtain Equation (6) below by reflecting the relaxed 2D strain information $\hat{E}_0$ in the optimization equation represented by Equation (4) above.

$$\operatorname*{argmin}_{x} \|E(x) - \hat{E}_0\|^2 \quad (6)$$

For example, the grading apparatus may determine positions of points on a sixth mesh candidate to satisfy a second objective function that minimizes a difference between the grading information E(x) and the relaxed 2D strain information $\hat{E}_0$. The second objective function may correspond to Equation 6 above, for example.

The grading apparatus may obtain a 2D pattern having an outline that is smoother and softer by Equation (6) above.

The grading apparatus may allow the target pattern to maintain a curvature of the source pattern using, for example, below Equation (7), which adds first constraints to maintain the curvature of the source pattern to the optimization scheme of above Equation (6).

$$\operatorname*{argmin}_{x} w_e \|E(x) - \hat{E}_0\|^2 + w_b \|B(x) - B_0\|^2 \quad (7)$$

where $B_0$ denotes a first curvature vector for all points on the outline and the inner line of the source pattern, B(x) denotes a second curvature vector on all points on the target pattern, $w_e$ denotes weight given to reducing strain differences, and $w_b$ denotes weight given to maintaining of the curvature.

The grading apparatus may set, for example, first constraints causing the second curvature (or the second curvature vector) for all points on the curves of the target pattern to maintain the first curvature (or the first curvature vector) for all points on the curves of the outlines and the inner lines of the source patterns. The grading apparatus may determine locations of points on a sixth mesh candidate using Equation (7) above to satisfy the first constraints, in addition to the second objective function described above with reference to above Equation (6). The grading apparatus may obtain the solution of above Equation (7) above to generate the target pattern which reduces the difference between the curvature of outlines in the source pattern and the curvature of outlines in the target pattern.

Figure 6:
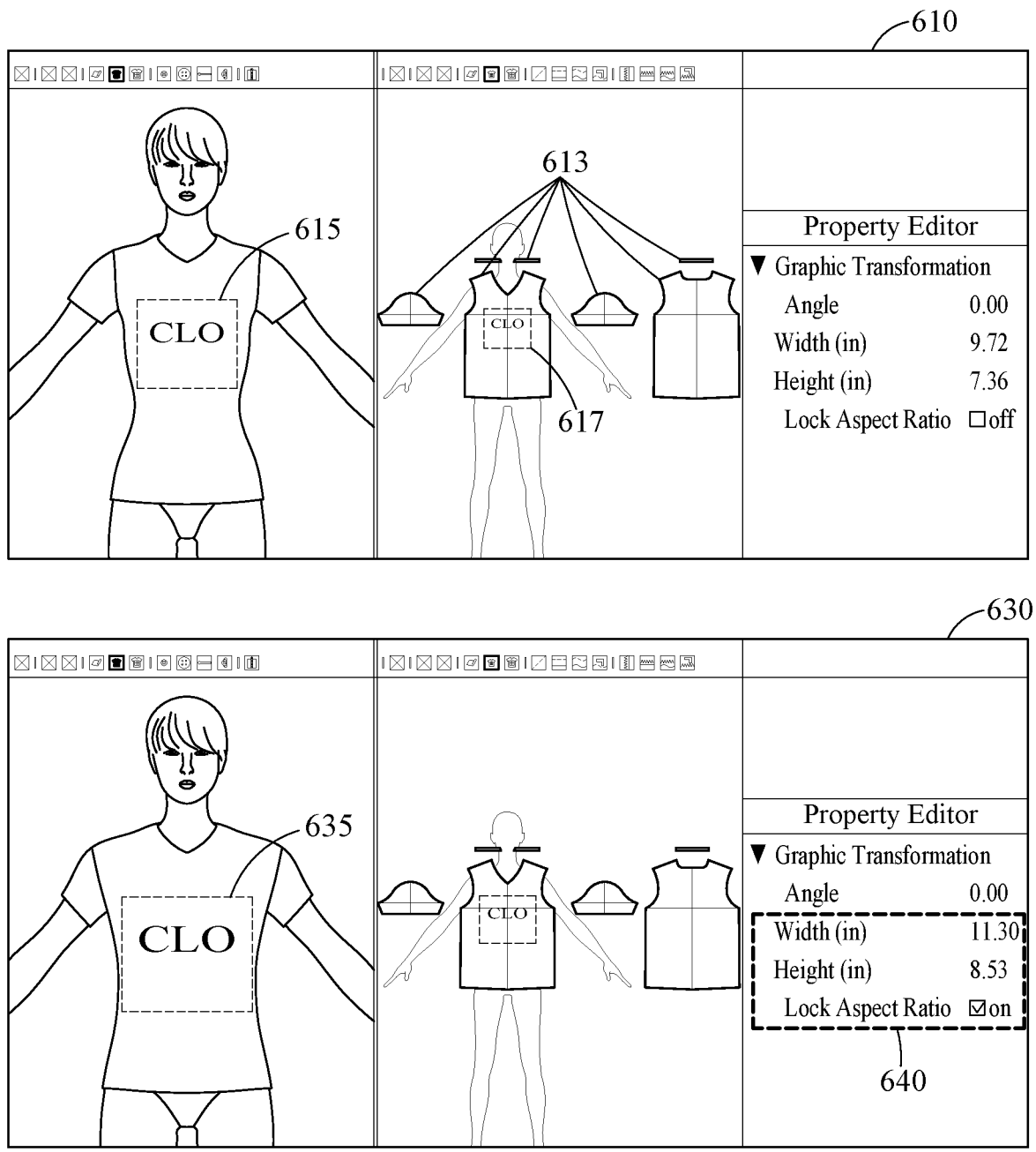
FIGS. 6 through 13 are diagrams illustrating examples of grading a supplemental material based on a type of the supplemental material, according to an example embodiment.

FIGS. 6 through 8B are diagrams illustrating examples of grading a supplemental material when the supplemental material is of a first type according to an example embodiment. In FIG. 6, illustrates a screen 610 displaying a source garment including a graphic image of logo "CLO" as the supplemental material 610, a source pattern, and a screen 630 displaying a result of grading the source garment and the logo to fit a target avatar. This is a first type of supplemental material. FIG. 6 shows a 2D pattern 613 formed by mesh fitting the body type of a 3D source avatar, and a supplemental material 615, shown in the screen 610, and a 3D target avatar shown in the screen 630 may be input.

When the supplemental material 615 has a graphic property such as a logo, the grading apparatus may identify the supplemental material 615 as a first type supplemental material, and form a graphic layer 617 having a shape of the supplemental material 615 on a polygon mesh of the 2D pattern 613 as shown in the screen 610. The graphic layer 617 may indicate a graphic image such as a print or logo, a normal map, a color layer, or the like. The normal map is used for faking the lighting of bumps and dents to add details without using more polygons. The color layer refers to a layer including color information.

The grading apparatus may determine at least one polygon associated with at least one supplemental material by matching coordinates of a supplemental material 635 shown in the screen 630 to vertices of the polygon mesh on which the graphic layer 617 is formed. The texture coordinates of the supplemental material 635 may be input from a user through a user interface 640 shown on a lower end on a right side of the screen 630, or set in advance. The grading apparatus may grade the supplemental material by applying, to the supplemental material, grading information that is determined to grade the 2D pattern 613 shown in the screen 610 such that the 2D pattern 613 corresponds to the 3D target avatar shown in the screen 630, in the same manner as applying the grading information to the 2D pattern 613 if the supplemental material is a scalable type. The grading apparatus may grade the supplemental material by applying the grading information of the 2D pattern that is determined as described above to the logo graphic image CLO which is the supplemental material in the same manner. The grading apparatus may grade the supplemental material to the supplemental material 635 shown in the screen 630 by deforming at least one of a position or a size of the graphic layer 617 based on the grading information of the 2D pattern. For example, when the first type supplemental material corresponds to binding and/or piping, the grading apparatus may calculate a deformed size of the supplemental material by a deformation of a mesh in the 2D pattern, not in the graphic layer 617.

Figure 7:
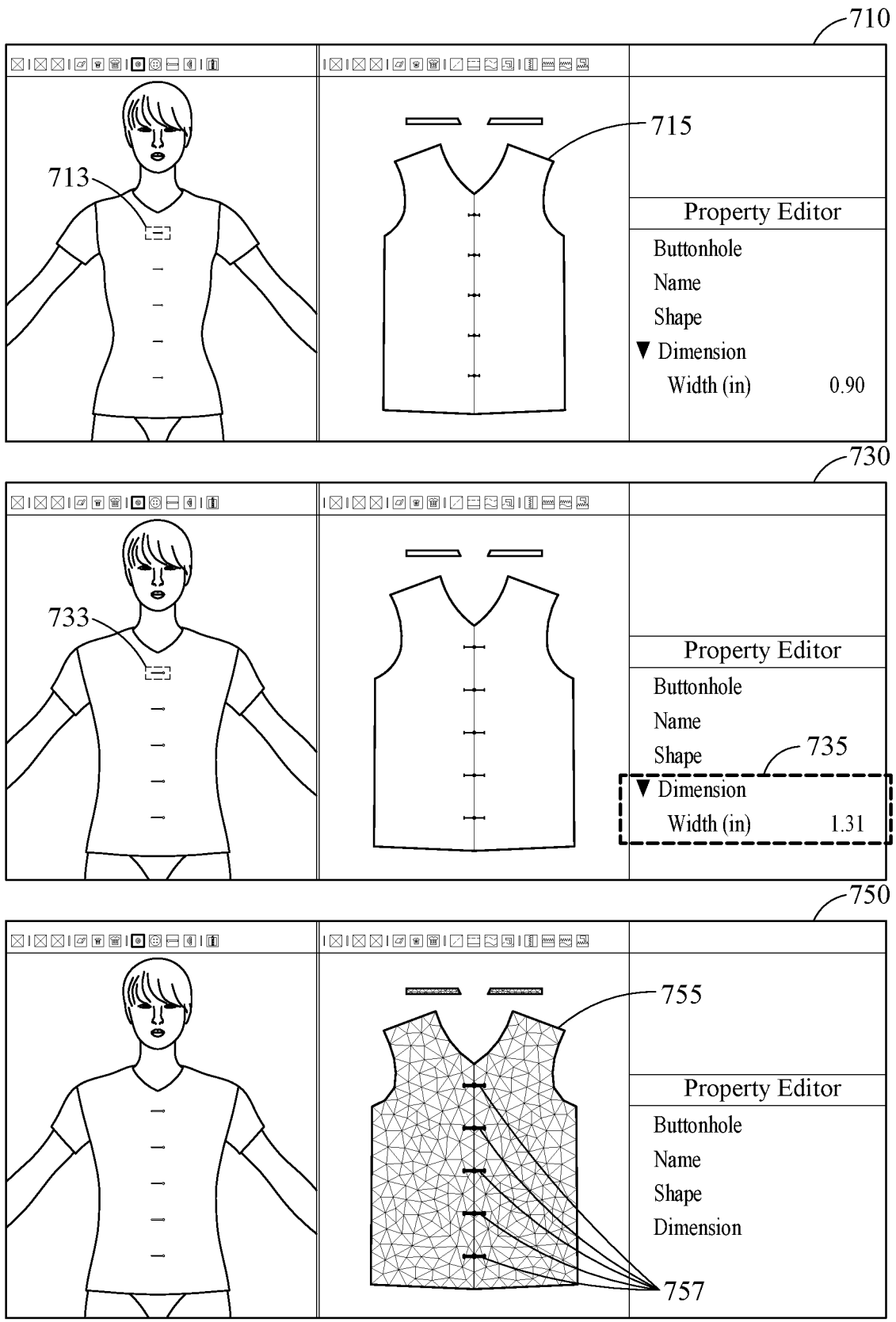

In FIG. 7, illustrated are a screen 710 displaying a source garment including buttonholes which are a first type supplemental material, and a source pattern, and a screen 750 displaying a result of grading the source garment and the buttonholes to fit a target avatar.

The grading apparatus may grade the buttonholes to ones shown in a screen 730 by applying, to the buttonholes, 2D pattern grading information that is determined to grade a 2D pattern 715 shown in the screen 710 to fit in a 3D target avatar shown in the screen 730, in the same manner as applying the grading information to the 2D pattern 715.

For example, when the grading apparatus grades buttonholes 713 of the source garment shown on a left side of the screen 710 to fit in the target avatar shown in the screen 730, the grading apparatus may indicate, on a polygon mesh 755 of a 2D pattern shown in the screen 750, a graphic image 757 of buttonholes as supplemental materials. The grading apparatus may determine at least one polygon associated with the buttonholes by matching texture coordinates of the buttonholes to vertices of the polygon mesh 755 on which the graphic image 757 of the buttonholes is indicated. The texture coordinates of the buttonholes may be set by a user through a user interface 735 displayed on a right side of the screen 730. The grading apparatus may grade the buttonholes by deforming at least one of a position or a size of the buttonholes based on grading information of the determined polygon.

Figure 8A:
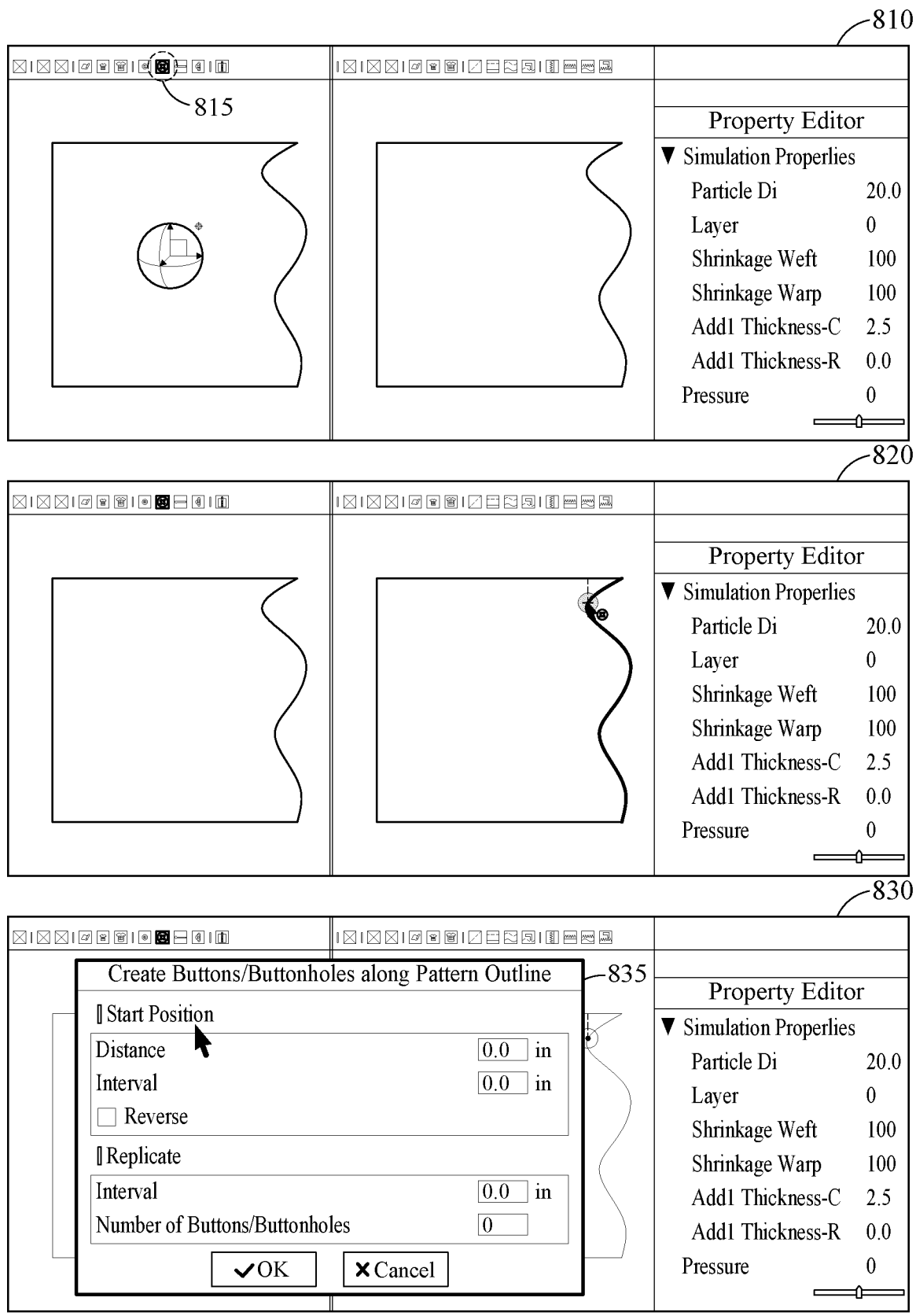
Figure 8B:
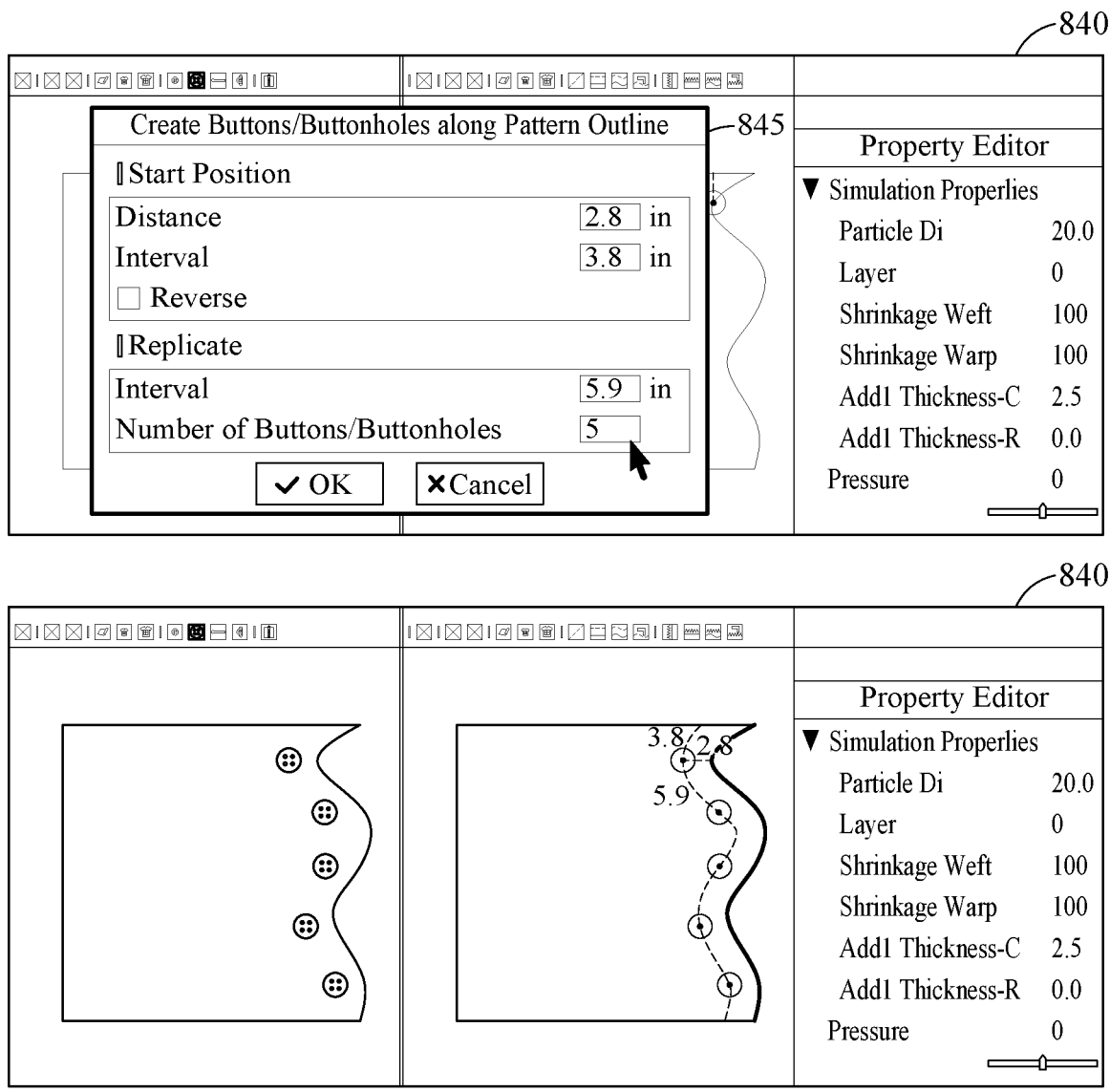

Hereinafter, a method of setting a button group as an example of a supplemental material and grading the button group is described with reference to FIGS. 8A and 8B. Referring to FIGS. 8A and 8B, screens 810, 820, 830, 840, and 850 that show a method of setting a button group which is a first type supplemental material are illustrated. For example, a user may generate a button group as a supplemental material by selecting a button generation icon 815 from a user interface at an upper end of the screen 810. In this example, when the button generation icon 815 is selected, a 3D coordinate for setting a button size or the like may be displayed on a 3D simulation window as shown in the screen 810.

When the button size is set, an outline of a 2D pattern on which a button is to be displayed may be selected as shown in the screen 820. After the outline on which the button is to be displayed is selected as shown in the screen 820, a user interface 835 may be displayed as shown in the screen 830, and the user may input a distance from a start point of a button to the outline of the 2D pattern, for example, 0.8 centimeters (cm), a distance from an end of the 2D pattern to a start position of a first button, for example, 3.8 cm, an interval between buttons, a total number of buttons, or the like, through the user interface 835.

When the user sets an interval (e.g., 5.9 cm) between buttons of a button group and a number (e.g., 5) of the buttons through a user interface 845 displayed on the screen 840 of FIG. 8B, the button group based on the set values may be displayed on the 2D pattern as shown in the screen 850 of FIG. 8B. The grading apparatus may generate a buttonhole group of buttonholes with a distance and an interval therebetween along an outline of the 2D pattern based on positions of buttons of the button group.

Even after the button group is displayed, the user may adjust the interval between the buttons of the button group and the total number of the buttons of the button group through a user interface.

As described above with reference to FIGS. 8A and 8B, after a button group and/or buttonhole group is generated on a 2D pattern of source garments, grading may be performed on the button group and/or buttonhole group. In such a case, the grading apparatus may calculate 2D strain information in a tangential direction to a curvature of the 2D pattern, and determine grading information for grading the 2D pattern to fit in a 3D target avatar based on the 2D strain information. The grading apparatus may grade the button group and/or buttonhole group by applying the grading information of the 2D pattern in the same manner.

Figure 9:
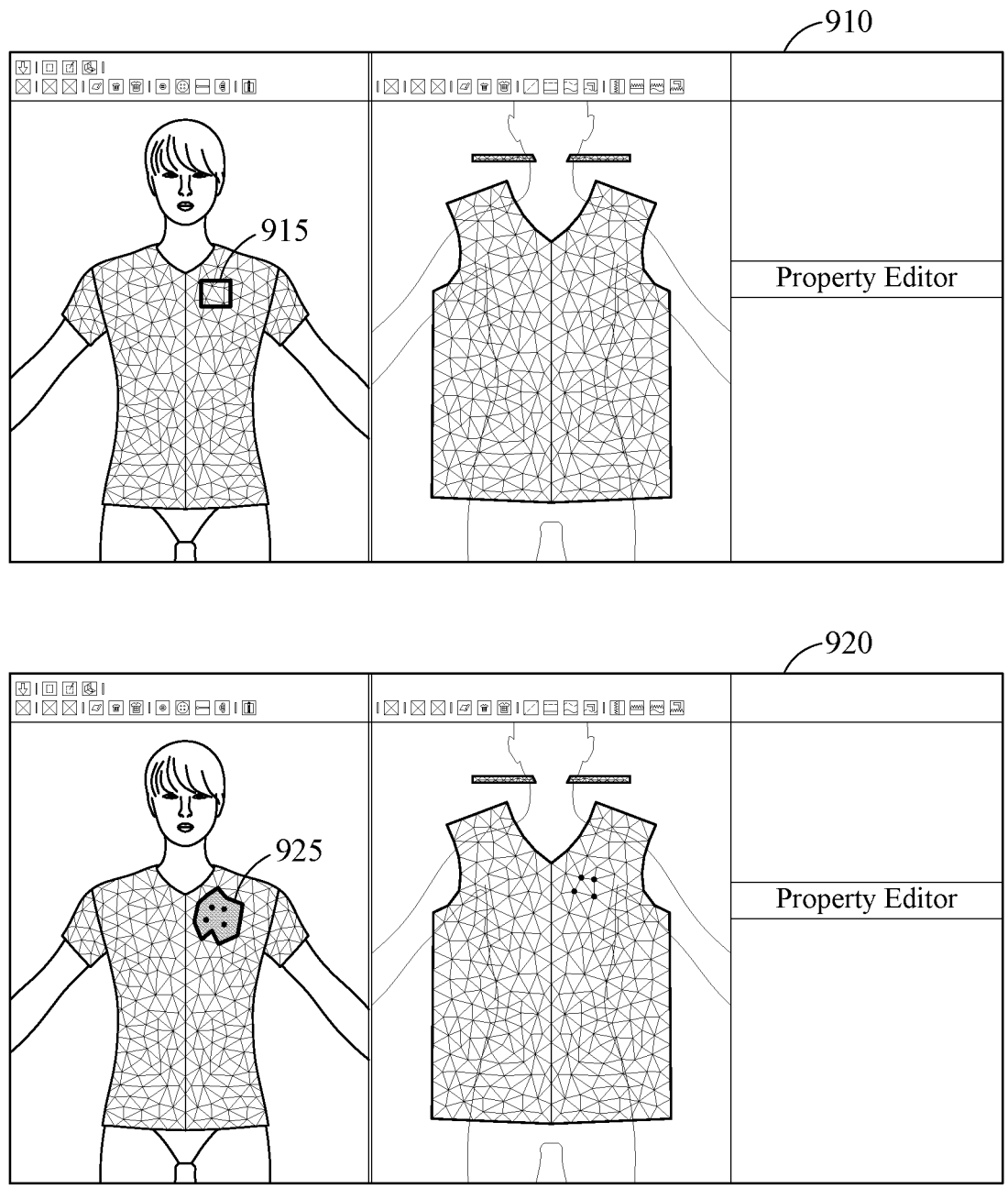

FIGS. 9 through 12 are diagrams illustrating examples of grading a supplemental material when the supplemental material is of a second type according to an example embodiment. Referring to FIG. 9, screens 910 and 920 illustrate grading of a pin as a supplemental material with an editing property set temporarily set for editing a pattern piece are illustrated.

A pin may be used to fix a certain portion of garments or a 2D pattern. The pin may also fix a point of the garments or the 2D pattern or a certain area of the garments or the 2D pattern. For example, a user may set a pin as a supplemental material on a 2D pattern shown in the screen 910. In this example, when the supplemental material is a pin having an editing property, the grading apparatus may set at least one first point or first point area 915 of the 2D pattern for fixing. The first point or first point area 915 represents the point or region being fixed. The grading apparatus may input a coordinate corresponding to the pin image on a polygon mesh 925 of a 2D pattern shown in the screen 920. The coordinate corresponding to the pin image may be, for example, a barycentric coordinate of vertices of a mesh corresponding to the first point area 915. The grading apparatus may determine at least one polygon associated with the pin among a plurality of polygons of the polygon mesh 925 of the 2D pattern based on the input coordinate. The grading apparatus may grade a position and a size of the pin based on grading information of the at least one polygon associated with the pin. As described above, the pin may fix a certain portion of garments, or fix one point of the garments or a certain area of the garments.

Figure 10A:
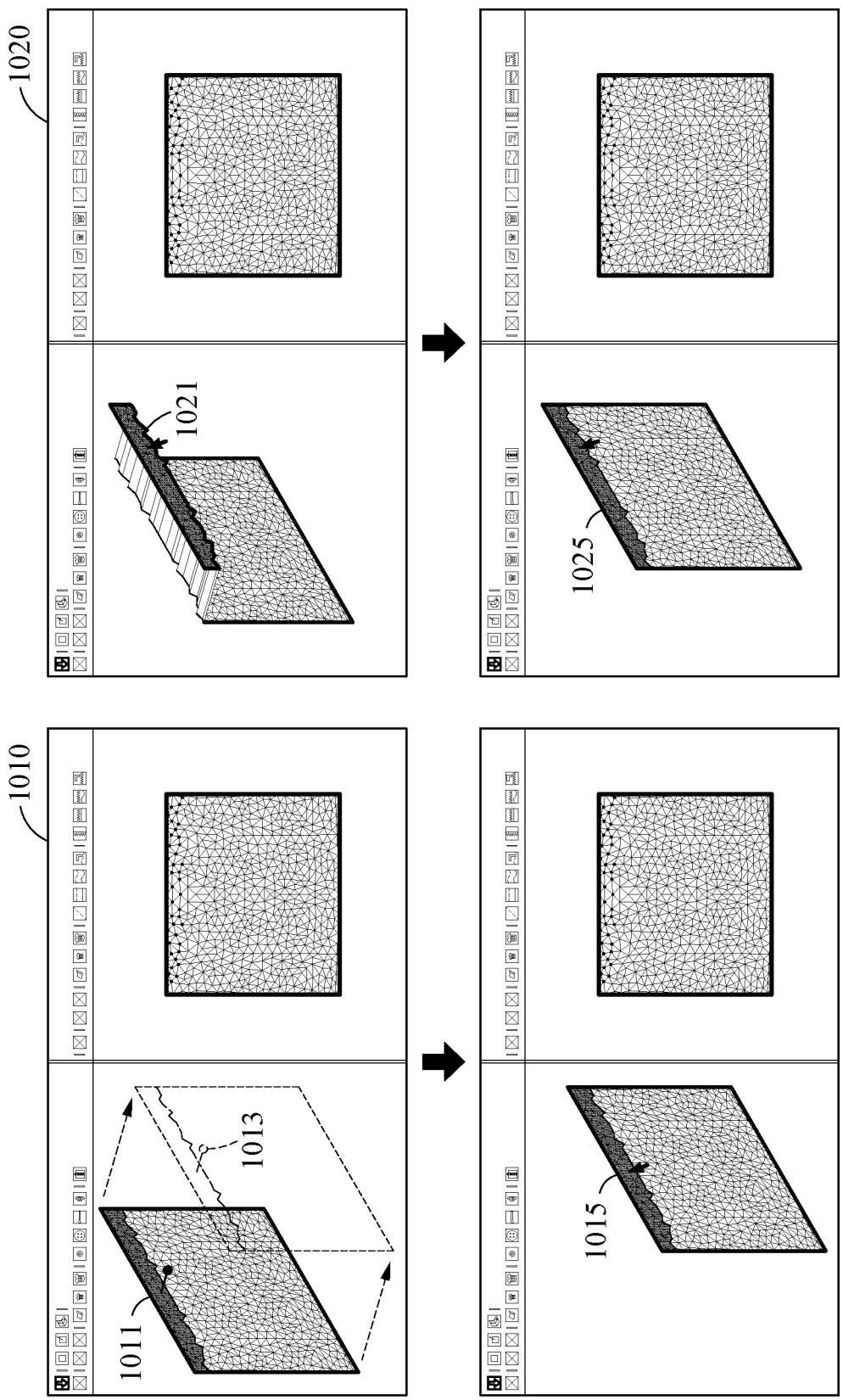
Figure 10B:
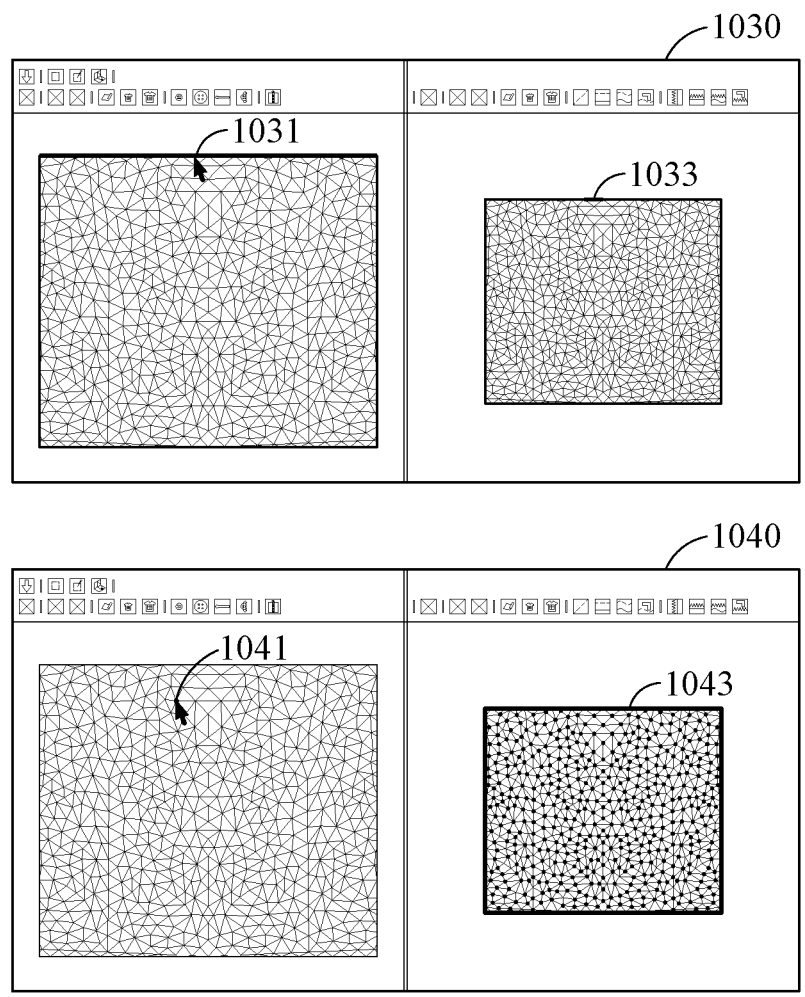

Referring to FIGS. 10A and 10B, screens 1010, 1020, 1030, and 1040 that show a movement of a pin and how to set the pin are illustrated. For example, a user may select pin setting from a user interface displayed on the screen 1010 of FIG. 10A. In this example, a pin image 1011 may be displayed on a 2D pattern displayed on the screen 1010. The user may click the pin image 1011, and then drag the pin image 1011 to a position of a pin image 1013. In this case, the 2D pattern including the pin image 1011 may be moved to the position of the pin image 1013 and displayed as in 1015.

In addition, when the user clicks a pin while a simulation is stopped as shown in the screen 1020, a pin region 1021 may be generated. When the simulation is resumed after moving a quadrangle or X, Y, and Z axes of the pin region 1021, the 2D pattern may move to a moved position of the pin region 1021.

According to an example, a pin may be set as a line segment unit. For example, as illustrated in FIG. 10B, the user may double click a point 1031 on an outline of a 2D pattern as shown in the screen 1030. In such a case, the pin may be set as a line segment unit 1033 corresponding to a segment including the point 1031 of the outline of the 2D pattern.

Alternatively, a pin may be set as a pattern unit. For example, as illustrated in FIG. 10B, the user may double click a vertex 1041 of a mesh of a 2D pattern as shown in the screen 1040. In such a case, the pin may be set for all pattern pieces 1043 of the mesh.

Figure 11:
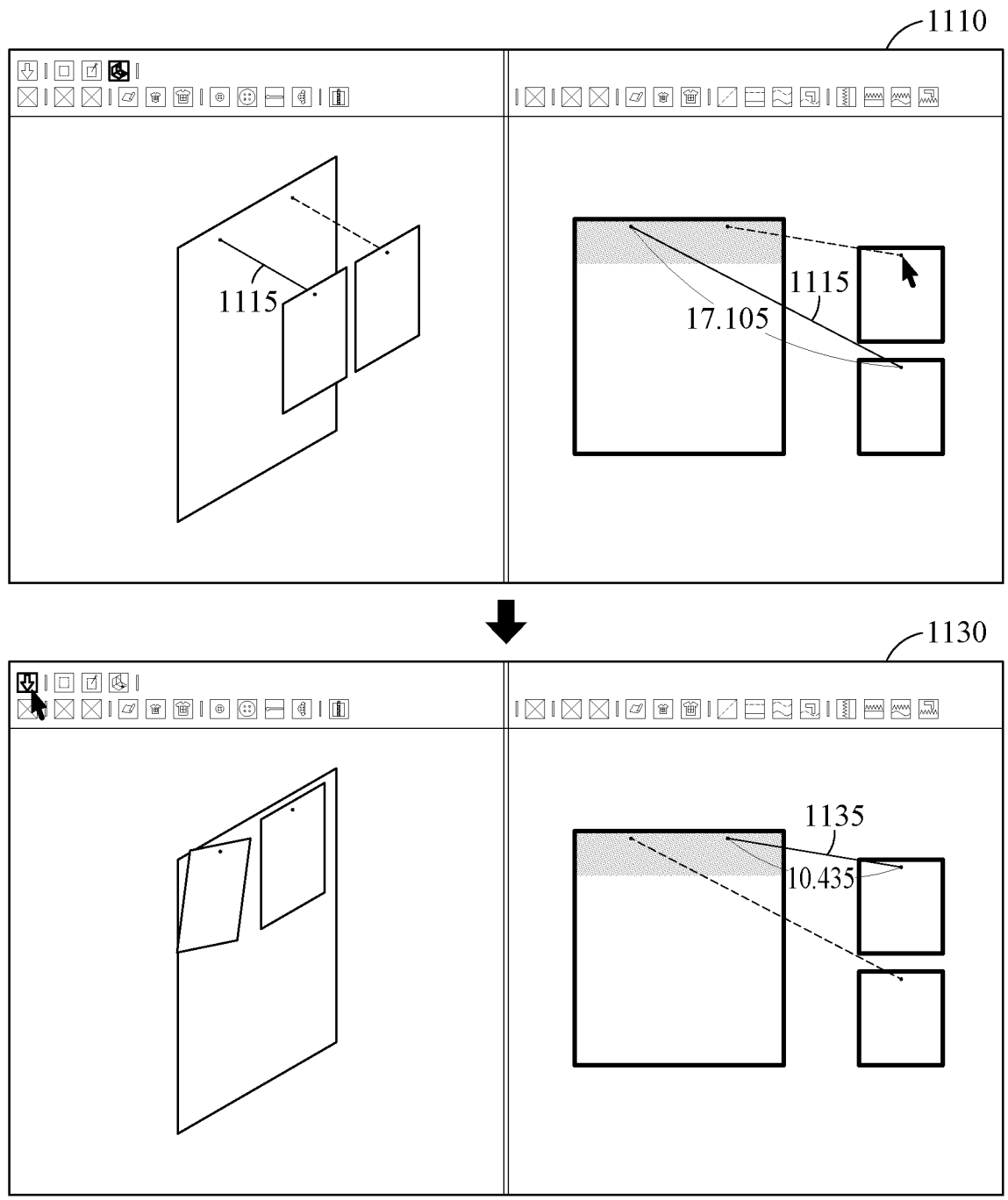

Referring to FIG. 11, screens 1110 and 1130 that show a method of grading a supplemental material which is a measure having an editing property by which the supplemental material is temporarily set to edit a pattern piece are illustrated. For example, when a measure having an editing property is selected as a supplemental material, the grading apparatus may display a length of reference lines 1115, 1135 as shown in the screens 1110 and 1130, and adjust a length ratio of the reference lines 1115, 1135 based on grading information of a 2D pattern.

As another example, when connecting two pieces of fabric having different shapes, points at which the two pieces of fabric meet each other are marked, respective reference points are placed so that they are in contact with each other, and fix the contact portions with tack pins, in order to perform sewing accurately as planned. A notch may correspond to a reference point that is marked to prevent fabric from being in disorganized when connecting the pieces of fabric.

Figure 12:
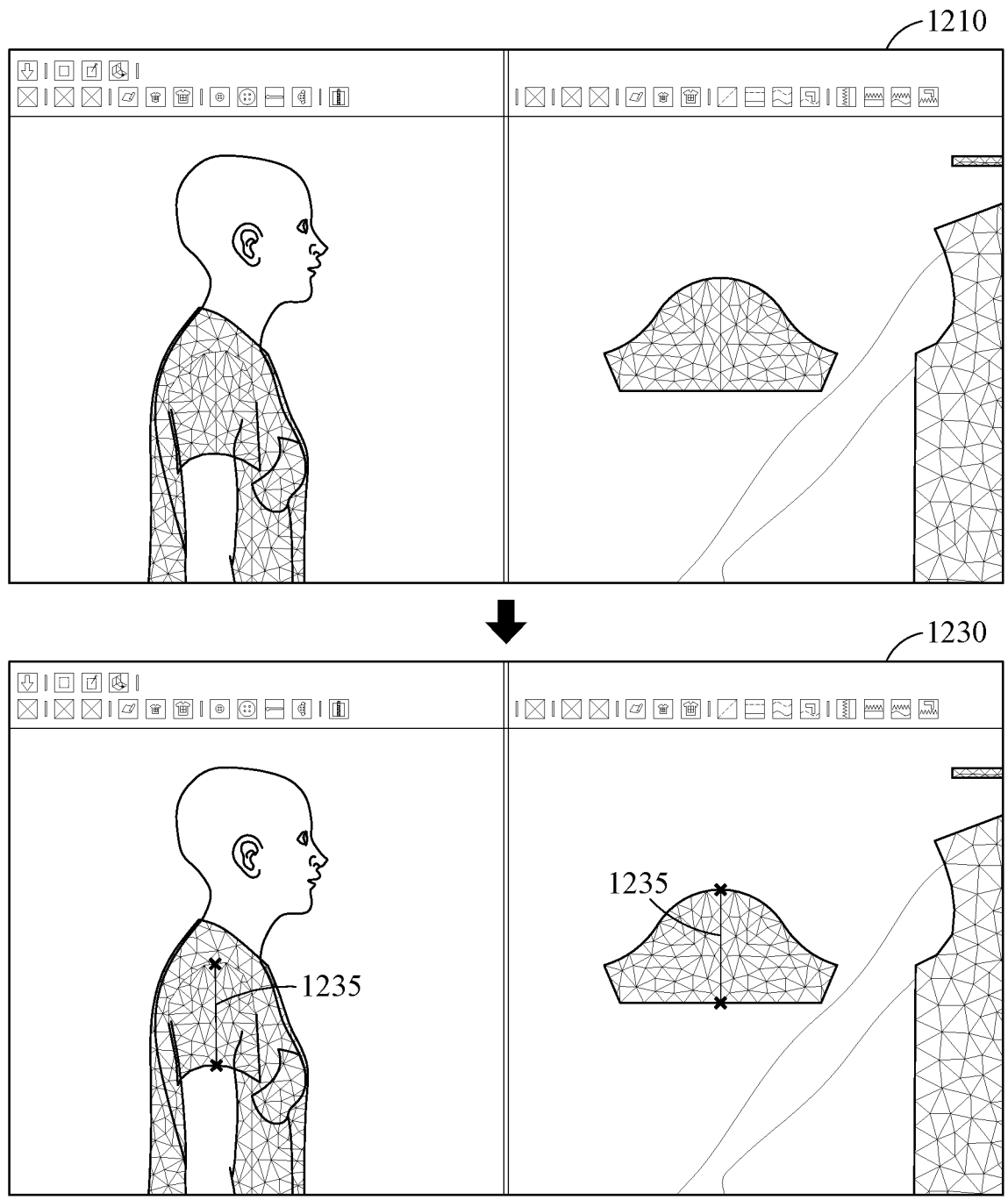

The grading apparatus may hide a reference line indicating, for example, a seam or a notch, as shown in a screen 1210 of FIG. 12 or display the reference line as shown in a screen 1230 of FIG. 12, according to the work convenience.

Figure 13:
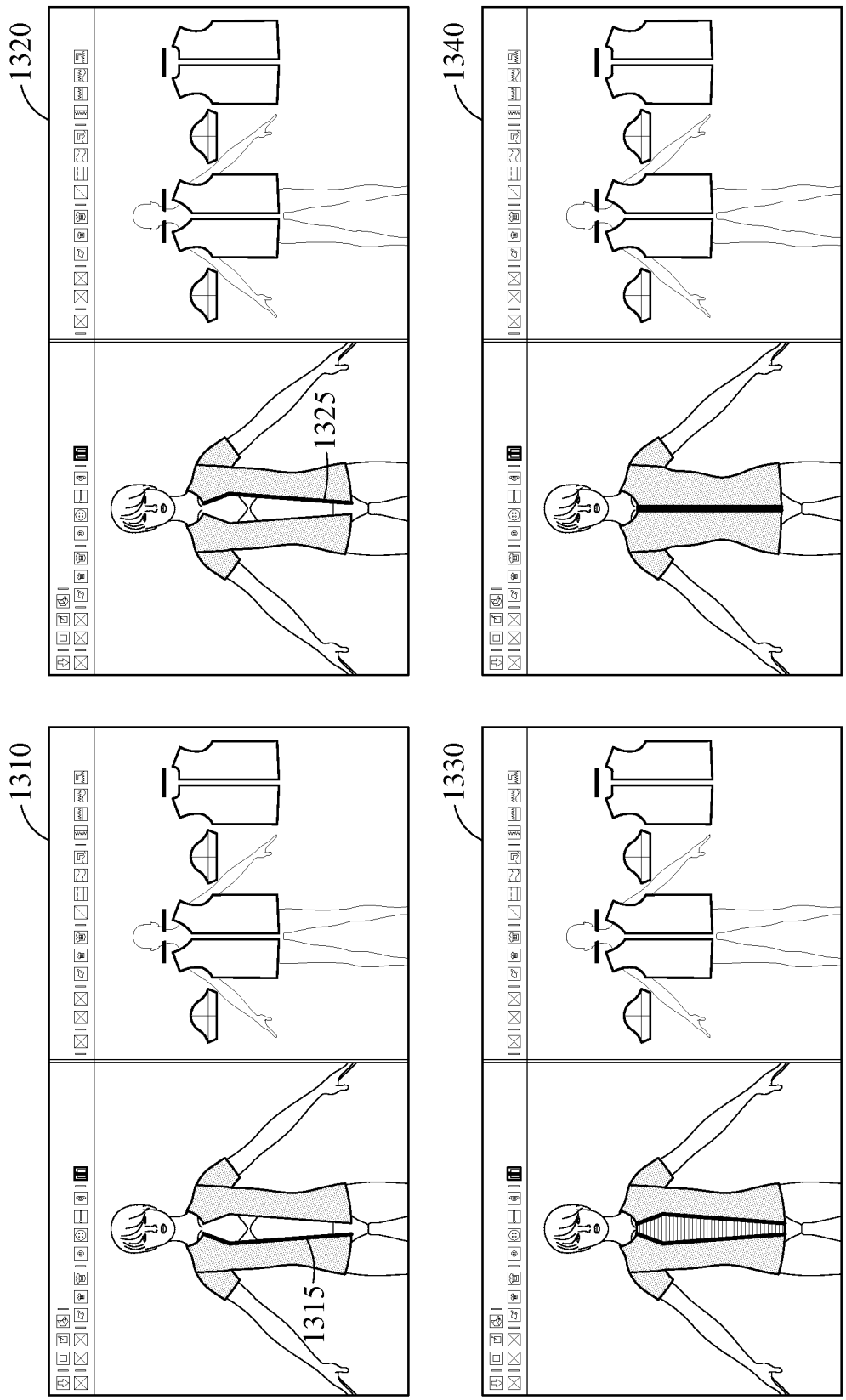

FIG. 13 is a diagram illustrating an example of grading a supplemental material when the supplemental material is of a third type, according to an example embodiment. Screens 1310, 1320, 1330, and 1340 of FIG. 13 show the process of placing a zipper as a supplemental material in a garment.

A zipper is an example of a third type supplemental material having a line property that is parameterized and set in a line of a pattern piece of a 2D pattern. Other third type of supplemental materials may include, among others, binding, piping, and a button group.

When a supplemental material is a zipper, the grading apparatus may receive, as an input from a user, settings for areas 1315, 1325 to be placed with the zipper in a garment, as shown in the screens 1310 and 1320.

When the area for placing the zipper is set, the grading apparatus may receive, as an input from the user through a user interface (not shown), settings for a total length, a width, a thickness, or the like of the zipper. When the settings for the zipper are completed as shown in the screen 1330, the grading apparatus may display a result of placing the zipper in source garments according to the settings input from the user as shown in the screen 1340.

Subsequently, the grading apparatus may grade the source garment with the zipper to fit in a 3D target avatar. In this case, the grading apparatus may determine at least one polygon associated with the zipper among a plurality of polygons modeling a 2D pattern of the source garment. The grading apparatus may grade the supplemental material based on grading information of the at least one polygon. That is, the grading apparatus may determine the at least one polygon by parameterizing the zipper along a line of a polygon mesh of a pattern piece of the 2D pattern to which the zipper is applied based on the grading information of the at least one polygon. The grading apparatus may grade the zipper to fit in target garments based on the grading information of the polygon determined along the line.

After the grading, the grading apparatus may maintain a length ratio between sewing lines to be sewed in the 2D pattern of the source garments to be the same in a target pattern. That is, the grading apparatus may make a length ratio (e.g., 1:1) between sewing lines connected in the target pattern the same as a length ratio (e.g., 1:1) between sewing lines connected in the source pattern. When such a length ratio between the sewing lines to be connected is not maintained well, a length may differ at a seam, and thus garments may become uneven or crumpled.

When performing the grading, a length ratio of sewing lines on a target pattern may be maintained using given after Equation (7) above.

For example, the grading apparatus may set a second limit that allows a second length ratio of sewing lines of a target pattern that are connected to each other by sewing on the target pattern converted based on positions of points on a sixth mesh candidate to satisfy a first length ratio of sewing lines of a corresponding source pattern.

The grading apparatus may measure both lengths of the sewing lines on the target pattern given after Equation (7) above, and calculate a target length of all line segments on both sewing lines of the target pattern to be the same as the first length ratio of the sewing lines on the source pattern.

For example, when a vector of the calculated target length of all the line segments is defined as $S_0$, the second limit for maintaining the target length may be represented as $\|S(x)-S_0\|^2$.

By adding, to Equation (7) above, the second limit for maintaining a length ratio of sewing lines, an optimization equation such as Equation (8) below may be obtained.

$$\operatorname*{argmin}_{x} w_e \|E(x) - \hat{E}_0\|^2 + w_b \|B(x) - B_0\|^2 + w_s \|S(x) - S_0\|^2 \quad (8)$$

The grading apparatus may determine the positions of the points on the sixth mesh candidate that satisfy Equation (8) satisfying the second limit in addition to a second objective function and a first limit.

By obtaining a solution of Equation (8) above, the grading apparatus may generate the target pattern that maintains a curvature of the source pattern as well as a length ratio of sewing lines.

According to an example, the grading apparatus may add a third limit that allows a pressure distribution of source garments to be maintained in the target garments during the optimization. In a third mesh of the source garments, a pressure distribution of a surface of a source avatar may be stored. The pressure distribution of the source garments may be converted into a pressure distribution of target garments based on a transformation relationship between the third mesh of the source garments and the first mesh of the source avatar. A portion of the source avatar that is increased in volume may be converted into a higher pressure in the source garments, and a portion of the source avatar that is decreased in volume may be converted into a lower pressure in the source garments. A 2D target pattern that satisfies the pressure distribution of the target garments calculated by a strain may then be obtained.

FIG. 14 is a diagram illustrating an example of a grading apparatus for garments including a supplemental material. Referring to FIG. 14, a grading apparatus 1400 includes a user interface 1410, a processor 1430, and an output device 1470. The grading apparatus 1400 may further include a memory 1450. The user interface 1410, the processor 1430, the output device 1470, and the memory 1450 may communicate with one another via a communication bus 1405.

The user interface 1410 may receive, from a user, a selection for a 3D source avatar, a 3D target avatar, and at least one supplemental material. The user interface 1410 may receive a touch input or the like through, for example, a stylus pen, a mouse, a keyboard, or a touch interface.

The processor 1430 may calculate 3D strain information between the 3D source avatar and the 3D target avatar. The processor 1430 may calculate 2D strain information of a 2D pattern corresponding to source garments draped over the 3D source avatar based on the 3D strain information. The processor 1430 may determine grading information for grading the 2D pattern such that the 2D pattern corresponds to the 3D target avatar based on the 2D strain information. The processor 1430 may identify at least one supplemental material included in the source garments. The processor 1430 may determine at least one polygon associated with the at least one supplemental material from a plurality of polygons modeling the 2D pattern. The processor 1430 may grade the at least one supplemental material based on grading information of the at least one polygon. The processor 1430 may apply the at least one supplemental material graded by the grading information of the at least one polygon to the 2D pattern graded by the grading information of the at least one polygon.

The memory 1450 may store, for example, the 3D source avatar and the 3D target avatar that are input via the user interface 1410 In addition, the memory 1450 may store the 3D strain information between the 3D source avatar and the 3D target avatar that is calculated by the processor 1430, and/or a mapping relationship between the 3D source garments draped over the source avatar and a body portion of the source avatar. In addition, the memory 1450 may store at least one of the 2D strain information of the 2D pattern or the grading information that is calculated by the processor 1430. The memory 1450 may store target garments converted from the source garments, and a 2D target pattern constituting the target garments.

The output device 1470 may output a result obtained by applying the at least one supplemental material graded by the grading information of the at least one polygon to the 2D pattern graded by the grading information of the at least one polygon. The output device 1470 may output the result onto a screen or to an outside of the grading apparatus 1400. The output device 1470 may be, for example, a display or a communication interface configured to communicate with the outside of the grading apparatus 1400. In addition, the output device 1470 may be a 2D pattern output device configured to output the 2D target pattern constituting the target garments onto a separate output object such as a paper or fabric.

In addition, the processor 1430 may perform one or more, or all, of the methods described above with reference to FIGS. 1 through 13 or algorithms corresponding to the methods. The processor 1430 may execute a program to control the grading apparatus 1400. A program code executed by the processor 1430 may be stored in the memory 1450. The processor 1430 may be configured as a central processing unit (CPU), a graphics processing unit (GPU), or a neural network processing unit (NPU), for example.

According to example embodiments described herein, it is possible to embody virtual garments including supplemental materials designed according to a deformed size of a target avatar without an additional task for the supplemental materials, by automatically deforming positions and sizes of the supplemental materials deformed by grading of a 2D pattern.

According to example embodiments described herein, it is possible to perform automatic grading on garments and supplemental materials without newly setting positions of the supplemental materials as points input by a user when editing move together as a size of a 2D pattern is automatically deformed by grading.

According to example embodiments described herein, it is possible to automatically grade supplemental materials such as buttons, buttonholes, rubber bands, zippers, and piping along an outline of a 2D pattern.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A grading method for garments comprising a supplemental material, comprising
    determining three-dimensional (3D) strain information between a 3D source avatar and a 3D target avatar, the strain information representing deformation of a target mesh of the 3D target avatar relative to a source mesh of the 3D source avatar;
    determining two-dimensional (2D) strain information of a 2D pattern corresponding to a source garment draped over the 3D source avatar based on the 3D strain information;
    determining grading information for grading the 2D pattern to the 3D target avatar, based on the 2D strain information;
    identifying at least one supplemental material in the source garments;
    determining at least one polygon associated with the at least one supplemental material among a plurality of polygons modeling the 2D pattern; and
    performing grading on the at least one supplemental material based on grading information of the at least one polygon.

2. The grading method of claim 1, wherein the at least one supplemental material comprises at least one of:
    a first type of supplemental material corresponding to a graphic property;
    a second type of supplemental material corresponding to an editing property; or
    a third type of supplemental material corresponding to a line property.

3. The grading method of claim 1, wherein the 2D pattern comprises a plurality of pattern pieces,
    wherein each of the pattern pieces is modeled with a polygon mesh based on a body type of the 3D source avatar, wherein the polygon mesh comprises a plurality of polygons.

4. The grading method of claim 1, wherein the determining the at least one polygon comprises:
    determining the at least one polygon associated with the at least one supplemental material among the plurality of polygons modeling the 2D pattern, for each type of the at least one supplemental material.

5. The grading method of claim 4, wherein, when the at least one supplemental material is of a first type, the determining the at least one polygon comprises:
    forming at least one graphic layer having a shape corresponding to the at least one supplemental material in a polygon mesh of the 2D pattern; and
    determining the at least one polygon associated with the at least one supplemental material by matching a vertex of the polygon mesh in which the at least one graphic layer is formed to texture coordinates of the at least one supplemental material.

6. The grading method of claim 5, wherein the graphic layer comprises at least one of a graphic image, a normal map, or a color layer.

7. The grading method of claim 5, wherein the performing of the grading on the at least one supplemental material comprises:
    grading the at least one supplemental material by deforming at least one of a position or a size of the at least one graphic layer based on the grading information of the at least one polygon.

8. The grading method of claim 4, wherein, when the at least one supplemental material is of a second type, the determining of the at least one polygon comprises:
    setting at least one first point for fixing the 2D pattern;
    indicating a pin image at the at least one first point;
    inputting a barycentric coordinate corresponding to the pin image to a polygon mesh of the 2D pattern; and
    determining the at least one polygon associated with the at least one supplemental material among the plurality of polygons based on the barycentric coordinate.

9. The grading method of claim 8, wherein the performing of the grading on the at least one supplemental material comprises:
    deforming a polygon mesh of the at least one supplemental material based on the grading information of the at least one polygon;
    calculating a deformed coordinate corresponding to the pin image in the deformed polygon mesh;
    indicating the pin image on the deformed coordinate, and setting a second point for the fixing to the deformed coordinate; and
    grading the at least one supplemental material in the deformed polygon mesh based on the second point.

10. The grading method of claim 4, wherein, for a third type supplemental material, the extracting of the at least one polygon comprises:
    extracting the at least one polygon by parameterizing the at least one supplemental material in a polygon mesh of a pattern piece of the 2D pattern to which the at least one supplemental material is applied, based on the grading information of the at least one polygon.

11. The grading method of claim 1, wherein the performing of the grading on the at least one supplemental material comprises:
    grading the at least one supplemental material for each type of the at least one supplemental material based on the grading information of the at least one polygon.

12. The grading method of claim 1, wherein the performing of the grading on the at least one supplemental material comprises:
    grading the at least one supplemental material while maintaining at least one of a curvature of an outline of the 2D pattern or a length ratio of a sewing line of the 2D pattern, based on the grading information of the at least one polygon.

13. The grading method of claim 1, wherein the calculating of the 3D strain information comprises:
calculating the 3D strain information by mapping a deformation between the 3D source avatar and the 3D target avatar in a corresponding mesh unit.

14. The grading method of claim 1, wherein the calculating of the 3D strain information comprises:
determining a mapping relationship between a deformed portion in which the deformation between the 3D source avatar and the 3D target avatar is present, and a pattern piece of the 2D pattern corresponding to the deformed portion; and
calculating the 3D strain information based on the determined mapping relationship.

15. The grading method of claim 1, wherein the calculating of the 2D strain information comprises:
when the at least one supplemental material is applied to a curved line of the 2D pattern, calculating the 2D strain information in a tangential direction to the curved line of the 2D pattern.

16. The grading method of claim 1, further comprising at least one of:
receiving group settings for buttons or buttonholes among the at least one supplemental material; or
receiving a selection from a user for the supplemental material, wherein the selection is for at least one of a distance from an outline of the 2D pattern to a buttonhole set as a group along with a button, a start point and end point in the 2D pattern at which the buttonhole is generated, a direction in which the buttonhole is generated in the 2D pattern, a number of buttonholes generated in the 2D pattern, an interval between the buttonholes, a property of the buttonholes, or a style of the buttonholes.

17. The grading method of claim 1, wherein the performing of the grading on the supplemental material comprises:
determining whether the at least one supplemental material is of a type that requires scaling;
determining presence of preset standard configurations for the at least one supplemental material; and
selecting a standard configuration from among the standard configurations based on a size of a scaled supplemental material based on a result of the determining.

18. The grading method of claim 1, further comprising:
receiving settings for whether to apply the grading to each type of the at least one supplemental material.

19. A non-transitory computer readable storage medium storing instructions thereon, the instructions when executed by a processor cause the processor to:
determine three-dimensional (3D) strain information between a 3D source avatar and a 3D target avatar, the strain information representing deformation of a target mesh of the 3D target avatar relative to a source mesh of the 3D source avatar;
determine two-dimensional (2D) strain information of a 2D pattern corresponding to a source garment draped over the 3D source avatar based on the 3D strain information;
determine grading information for grading the 2D pattern to the 3D target avatar, based on the 2D strain information;
identify at least one supplemental material in the source garments;
determine at least one polygon associated with the at least one supplemental material among a plurality of polygons modeling the 2D pattern; and
perform grading on the at least one supplemental material based on grading information of the at least one polygon.

20. An apparatus for grading a garment with a supplemental material, comprising:
a user interface configured to receive selection of a three-dimensional (3D) source avatar, a 3D target avatar, and at least one supplemental material, from a user;
a processor configured to:
determine three-dimensional (3D) strain information between the 3D source avatar and the 3D target avatar, the strain information representing deformation of a target mesh of the 3D target avatar relative to a source mesh of the 3D source avatar,
determine two-dimensional (2D) strain information of a 2D pattern corresponding to a source garment draped over the 3D source avatar based on the 3D strain information,
determine grading information for grading the 2D pattern to the 3D target avatar, based on the 2D strain information,
identify the at least one supplemental material in the source garments,
determine at least one polygon associated with the at least one supplemental material among a plurality of polygons modeling the 2D pattern, and
perform grading on the at least one supplemental material based on grading information of the at least one polygon; and
an output device configured to output a result of applying the at least one supplemental material graded by the grading information of the at least one polygon to the 2D pattern graded by the grading information of the at least one polygon.

* * * * *